United States Patent
Persson et al.

(10) Patent No.: US 12,233,984 B2
(45) Date of Patent: Feb. 25, 2025

(54) BICYCLE TRAILER HITCH

(71) Applicant: THULE SWEDEN AB, Hillerstorp (SE)

(72) Inventors: Joakim Persson, Skillingaryd (SE); Maja Petersson, Värnamo (SE); Björn Carlsson, Värnamo (SE)

(73) Assignee: Thule Sweden AB, Hillerstorp (SE)

( * ) Notice: Subject to any disclaimer, the term of this patent is extended or adjusted under 35 U.S.C. 154(b) by 122 days.

(21) Appl. No.: 18/046,049

(22) Filed: Oct. 12, 2022

(65) Prior Publication Data
US 2023/0121444 A1  Apr. 20, 2023

(30) Foreign Application Priority Data
Oct. 14, 2021 (EP) .................................... 21202684

(51) Int. Cl.
*B62K 27/12* (2006.01)
*B62K 27/00* (2006.01)

(52) U.S. Cl.
CPC ............ *B62K 27/12* (2013.01); *B62K 27/003* (2013.01)

(58) Field of Classification Search
CPC ............................... B62K 27/003; B62K 27/12
See application file for complete search history.

(56) References Cited

U.S. PATENT DOCUMENTS

| | | | | |
|---|---|---|---|---|
| 4,721,320 A | * | 1/1988 | Creps | B62K 27/12 280/495 |
| 6,099,008 A | * | 8/2000 | Caffey | B62K 27/12 280/503 |
| 6,663,126 B2 | | 12/2003 | Britton et al. | |
| 7,131,657 B1 | * | 11/2006 | Witt | B62K 27/12 280/204 |
| 7,341,265 B1 | * | 3/2008 | Liu | B62K 27/12 280/204 |
| 8,240,695 B1 | * | 8/2012 | Liu | B60D 1/01 280/503 |
| 2004/0173988 A1 | * | 9/2004 | Britton | B62K 27/12 280/204 |
| 2010/0244405 A1 | * | 9/2010 | Assaf | B62K 27/02 280/727 |
| 2015/0115573 A1 | * | 4/2015 | Bossel | B62K 27/12 280/504 |

\* cited by examiner

*Primary Examiner* — Kevin Hurley
*Assistant Examiner* — Hosam Shabara
(74) *Attorney, Agent, or Firm* — Sterne, Kessler, Goldstein & Fox P.L.L.C.

(57) ABSTRACT

A trailer hitch for releasably connecting a trailer to a bicycle includes a body and a safety device. The body is configured to attach the trailer to the trailer hitch and configured to mount to the bicycle. The safety device is configured to provide a redundant connection of the trailer to the bicycle. The safety device includes a first securing element configured to connect the body of the trailer hitch to a frame of the bicycle. The first securing element is configured to remain attached to the bicycle frame independently of an attachment of the trailer to the trailer hitch.

20 Claims, 13 Drawing Sheets

BICYCLE TRAILER HITCH

CROSS REFERENCE TO RELATED APPLICATION

This application claims priority to EP application Ser. No. 21/202,684.3, filed Oct. 14, 2021, which is incorporated herein in its entirety by reference.

TECHNICAL FIELD

The present disclosure relates to a trailer hitch for releasably connecting a trailer to a bicycle so that the bicycle can tow the trailer. The present disclosure also relates to a bicycle trailer system.

PRIOR ART

Bicycles are not only a form of personal transportation. With an attached trailer, bicycles can also be used for transportation of cargo and/or passengers, such as children. For that purpose, trailer hitches are available for bicycles that allow to releasably connect a trailer to the bicycle. A reliable and cost-effective bicycle trailer hitch is described in U.S. Pat. No. 6,663,126 B2, which requires a drawbar to be inserted into the trailer hitch from a forward facing aperture.

An attached trailer will require additional effort from the cyclist due to the added weight. Further, maneuvering can be impeded, in particular due to the overall increased length. Hence, when not transporting cargo and/or passenger, a user usually wishes to disconnect the trailer from the bicycle. Correspondingly, a trailer will usually thus not yet be connected when the user wishes to use the trailer for transportation of cargo and/or passengers. There is often a situation where the user arrives at the trailer and first wishes to load cargo before connecting the trailer to the bicycle, for example to avoid placing the cargo on a dirty ground and/or to avoid the need to pick up the cargo again. Similarly, a user often wishes to first restrain a child in the trailer before attaching it to the bicycle.

However, a trailer already containing cargo and/or passengers will be heavy, so that attachment may be cumbersome. In addition, regulations often require a redundant connection, for example with safety straps. Such safety straps usually are wrapped around the frame of the bicycle, rendering connecting and disconnecting of the trailer cumbersome and time consuming. In addition, there is a high chance of the hand of the user unwantedly touching a dirty part of the bike.

BRIEF SUMMARY

A first aspect relates to a trailer hitch for releasably connecting a trailer to a bicycle. The trailer hitch is configured for arrangement at a rear of the bicycle. For example, the trailer hitch may be mounted to a rear part of the bicycle, such as a rear axle of the bicycle, a tube connecting the rear axle to other parts of the frame of the bicycle, and/or a seat tube. For example, the trailer hitch may also form a rear part of the bicycle, such as part of the frame. The rear part of the bicycle may be a frame part adjacent to the rear axle or a part of the rear axle. The trailer hitch may be an integral part of the bicycle. In particular, a body of the trailer hitch may form part of the frame of the bicycle. The body may form a through hole configured to receive the rear part of the bicycle to mount the trailer hitch to the bicycle. For example, the through hole may be configured to receive the rear axle of the bicycle. The body may alternatively or additionally comprise a clamp for mounting the trailer hitch to the bicycle. The trailer hitch may be configured for a predetermined mounting position on the rear axle of the bicycle.

The trailer hitch may comprise a body with a receiving space configured for receiving a tow element attachable to a drawbar of the trailer and an aperture configured for inserting the tow element into the receiving space. The receiving space may, for example, be an interior space, slit and/or recess in the body. A shape of the receiving space may at least partially correspond to a shape of the tow element. The tow element may be an integral part of the drawbar or an element fixedly or removably attached to a bar element of the drawbar. The tow element may be permanently attached to the drawbar by gluing, welding, screwing or by being an integral part of a bar element of the drawbar. For example, the tow element may be configured as a tow ball or pin. An attachment of the tow element to drawbar may be flexible or rigid. For example, the tow ball may be attached to a bar element with a connection element, such as a flexible rubber element or a rigid metal element. The flexible attachment may facilitate relative movement of the trailer and the bicycle.

The aperture may connect the receiving space of the body with an exterior. The aperture may be configured, in particular sized and/or shaped, to allow insertion of the tow element through the aperture, for example in a predetermined orientation of the tow element relative to the aperture. The body may be formed from a metal material. The body may have a unitarian one-piece design.

Receiving the tow element may attach the trailer to the trailer hitch. For example, the body of the trailer hitch is configured so that insertion into the receiving space besides through the aperture is blocked. The body may limit the receiving space. The body may comprise one or several walls. Inserting the tow element may comprise a pushing of the tow element through the aperture. Insertion of the tow element may connect the trailer to the trailer hitch. Extracting the tow element for disconnection of the trailer may comprise a pulling of the tow element out of the receiving space through the aperture.

The aperture may face in a direction transversal to a forward-backward direction of the bicycle. For example, the aperture is facing in a direction transversal to a forward-backward direction of the bicycle when the trailer hitch is mounted to the bicycle. The forward-backward direction of the bicycle may correspond to a direction of straight forward riding. For example, the aperture may face in a direction orthogonal to the forward-backward direction of the bicycle, in particular sideways. The aperture may face in a an essentially horizontal direction when the trailer hitch is mounted to the bicycle, in particular with the bicycle standing upright, and/or when the trailer hitch is resting on its bottom side. The forward-backward direction of the bicycle may correspond to a forward-backward direction of the body of the trailer hitch.

The tow element may only be inserted into the receiving space through the aperture in a direction substantially parallel to the direction the aperture is facing. The direction substantially parallel to the facing direction of the aperture can be a direction normal to the aperture. For example, the aperture is facing in the direction normal to its opening. Such a configuration may allow a solid wall of the body to limit the receiving space in both the forward and backward direction. This may be the two directions in which the trailer hitch is subjected to the highest loads from the trailer, for example due to acceleration and braking. Connecting of the trailer to the bicycle is thus very robust and a very heavy trailer can be connected safely. A maximum load of the trailer hitch may be high. Further, the tow element can be inserted from the side of the bicycle. This allows easy attachment of a very heavy trailer. Instead of needing to roll the trailer forward and/or backward for inserting the tow element into the body of the trailer hitch, the trailer can simply be rotated around a vertical axis. For example, the trailer can roll forward with a left tire and backwards with a right tire, thus turning on a spot. Such maneuvering may be less strenuous for a user. Further, a sideways insertion or downwards insertion is easier to achieve without any collision between the bicycle and the trailer. In particular, connection of the trailer may be easier when the bicycle and/or trailer are standing on an inclined surface.

In an embodiment of the trailer hitch according to the first aspect, the trailer hitch forms a part of the bicycle. For example, the body of the hitch may also form a tube that holds the rear axle. Hence, no mounting and unmounting of the trailer hitch from the bicycle is necessary. Further, if the body also provides part of the frame, overall weight of the bicycle with the trailer hitch may be low.

In an embodiment of the trailer hitch according to the first aspect, the trailer hitch is configured for mounting to the rear part of the bicycle in the form of a rear axle of the bicycle. For example, the trailer hitch may be configured for mounting to the rear axle of the bicycle. Such a configuration provides a connecting position of the trailer that facilitates riding and maneuvering of the bicycle with the attached trailer. Moreover, center of gravity may be low and/or remain unchanged and a suspension for the rear tire may also provide suspension for the trailer connection and/or remain fully functional.

In an embodiment of the trailer hitch according to the first aspect, the tow element is at least partially ball-shaped. The ball-shaped part of the tow element may form a ball joint with the receiving space, thus facilitating relative movement of the trailer and the bicycle. For example, a partially ball-shaped tow element may comprise a spherical upper surface and/or lower surface that allows the tow element to rotate with low friction around an essentially vertical axis in the receiving space. The tow element may be formed as a complete or partial sphere. The complete tow element may be ball shaped or just the section of the tow element configured for insertion into the receiving space of the body of the trailer hitch.

In an embodiment of the trailer hitch according to the first aspect, the tow element may be inserted into the receiving space only through the aperture. Similarly, the tow element may be extracted from the receiving space only through the aperture and/or only in a direction substantially parallel to the direction the aperture is facing. Connecting and disconnecting the trailer is thus obvious for a user. Further, such a configuration can avoid incorrect connecting the trailer to the trailer hitch, thus increasing safety of use.

In an embodiment of the trailer hitch according to the first aspect, the aperture is facing in a direction parallel to a longitudinal direction of the rear axle of the bicycle, for example when the trailer hitch is mounted to the bicycle. In an embodiment of the trailer hitch according to the first aspect, the aperture is facing in a direction essentially perpendicular to the forward-backward direction of the bicycle, in particular when the trailer hitch is mounted to the bicycle. In an embodiment of the trailer hitch according to the first aspect, the aperture is facing away from a rear tire of the bicycle, in particular when the trailer hitch is mounted to the bicycle. In an embodiment of the trailer hitch according to the first aspect, the aperture is configured for insertion of the tow element along the direction transversal to a forward-backward direction of the bicycle, in particular when the trailer hitch is mounted to the bicycle. This facilitates connecting the trailer and avoids needing to tilt the trailer forward or backward out of an essentially horizontal alignment and/or use position for attachment to the trailer hitch.

In an embodiment of the trailer hitch according to the first aspect, the aperture is larger than the tow element. Insertion may thus be easy and intuitive. For example, a diameter of the aperture may be larger than a diameter of the tow element, in particular a largest diameter of the tow element. A shape of the aperture may be larger than a cross-section of the tow element that needs to be inserted through the aperture. For example, the aperture may have a circular shape.

In an embodiment of the trailer hitch according to the first aspect, the body of the trailer hitch is configured to block insertion of the tow element into the receiving space besides through the aperture. In an embodiment of the trailer hitch according to the first aspect, the body of the trailer hitch is configured to block extraction of the tow element from the receiving space besides through the aperture.

In an embodiment of the trailer hitch according to the first aspect, the receiving space at least partially corresponds in shape to a shape of the tow element. In an embodiment of the trailer hitch according to the first aspect, the receiving space is configured to cause self-centering of the tow element in the receiving space. For example, a surface of a wall limiting the receiving space at the bottom may be spherical and/or have a concave side facing the receiving space, causing the tow element to slide into a centered position and to smoothly move within the receiving space when riding the bicycle with the connected trailer.

In an embodiment of the trailer hitch according to the first aspect, the trailer hitch is configured to prevent or reduce movement of the tow element arranged in the receiving space in the forward-backward direction of the bicycle. For example, the receiving space can be sized and/or shaped so that the tow element will essentially always rest on a back wall and/or forward wall of the body of the trailer hitch. Preventing or at least reducing forward and backward movement of the tow element relative to the trailer hitch as compared to a trailer hitch that essentially allows the tow element to float some distance, such as a couple of millimeters, in the forward-backward direction may allow a smoother ride with the bicycle when the trailer is attached. For example, a self-centering configuration may also prevent or reduce forward and backward relative movement. Further, the reduced movement in the forward-backward direction also allows for a smoother rotation of the tow element in a vertical axis in the receiving space, which facilitates steering with the bike. By comparison, rigidly attaching a drawbar to a pin of a trailer hitch may block or at least hinder such a turning motion.

In an embodiment of the trailer hitch according to the first aspect, a size of the receiving space in the forward-backward direction of the bicycle corresponds to a size of the tow element. For example, a length of the receiving space in the forward-backward direction may correspond to a length of the tow element in the forward-backward direction, in particular with the tow element in a towing position. This may prevent or reduce forward and backward movement of the tow element relative to the trailer hitch.

In an embodiment of the trailer hitch according to the first aspect, the trailer hitch comprises a retention device adjustable between a blocking state blocking movement of the tow element through the aperture and a release state allowing movement of the tow element through the aperture. The retention device secures the tow element in the receiving space so that unwanted disconnection can be avoided, for example in case of forces acting sideways on the connection. In the blocking state, a drawbar and/or the connection element between the bar element and the tow element may extend into the receiving space, for example through the aperture or some other opening, such as a slot.

The retention device may be biased towards the blocking state. The bias towards the blocking state may avoid a situation in which the tow element is arranged in the receiving space but not secured therein. No manual adjustment in the blocking state by the user may be necessary due to the bias. For example, only manual adjustment into the release state is necessary. Once a user does not hold the retention device in the release state, the retention device may automatically self-adjust into the blocking state. For example, the retention device may be spring biased towards the blocking state. Alternatively or additionally, adjustment into the release state may need elastic deformation and/or deflection so that the retention device will return into the blocking state afterwards.

In an embodiment of the trailer hitch according to the first aspect, the retention device is configured to self-adjust into the release state when the tow element is inserted into the receiving space through the aperture. For example, the tow element may push and/or deform a blocking element out of the way, in particular inwards into the receiving space of the body of the trailer hitch, when being inserted into the receiving space. No manual adjustment of the retention device is thus necessary for connecting the trailer, resulting in easy handling and fast connection of the trailer. Further, the user is not required to use a hand for adjusting the retention device during connection of the trailer so that this hand can be user for different purposes, such as further stabilizing the trailer and/or bike.

In an embodiment of the trailer hitch according to the first aspect, the retention device is configured to block adjustment into the release state at least or only without previous adjustment of the retention device into the release state when trying to extract the tow element from the receiving space through the aperture and/or when the tow element arranged in the receiving space is moved towards the aperture. Such a configuration can prevent accidental disconnection of the trailer. For example, the retention device needs to be manually adjusted prior to extracting the tow element from the receiving space. For example, the tow element may push and/or deform a blocking element into the aperture and/or an end stop formed by the body of the trailer hitch when a user tries to extract the tow element from the receiving space without previous adjustment of the retention device in the release state.

In an embodiment of the trailer hitch according to the first aspect, the retention device comprises a blocking element. The blocking element may at least partially obstruct the aperture in the blocking state of the retention device. For example, the blocking element may be arranged adjacent or in the aperture when the retention device is in the blocking state. The blocking element may at least partially release the aperture in the release state of the retention device. For example, the blocking element may be arranged spaced apart from the aperture when the retention device is in the release state and/or further away from the aperture than in the blocking state. The blocking element may be partially flexible or completely rigid. For example, the blocking element may be configured as a metal pin or lever. The blocking element may be attached to the body of the trailer hitch, for example moveably attached. The blocking element in the release position may at least unblock the aperture far enough so that the tow element may be moved therethrough. At least a part of the blocking element may extend beyond the body of the trailer hitch. Such a part of the blocking element protruding from the body of the trailer hitch may be configured for manual actuation of the blocking element into the release position. Such a part may form an actuation section of the blocking element. The blocking element may be configured to remain attached during adjustment of the retention device. The blocking element may be configured to remain permanently attached to the body of the trailer hitch. Hence, there is no risk of the user losing the blocking element. For example, the blocking element may not be removable from the body of the trailer during normal use and/or without requiring a disassembly.

In an embodiment of the trailer hitch according to the first aspect, the blocking element is transversally moveably attached to the body of the trailer hitch. The blocking element is moveable between a blocking position to adjust the retention device into the blocking state, wherein the blocking element at least partially blocks the aperture in the blocking position, and a release position to adjust the retention device into the release state. For example, the blocking element may be moved transversally between the blocking position and the release position. A transversally moveably attached blocking element may be a cost-effective and lightweight configuration. The blocking element may be configured as a pin, in particular a round pin. A movement axis of the transversally moveable blocking element may extend transversal to the aperture, for example in the left-right direction and/or along an axis parallel to the rear axle, in particular when the trailer hitch is mounted to the bicycle. The left-right direction of the trailer hitch may correspond to the left-right direction of the bicycle and/or the longitudinal extension of the rear axle. At least a part of the blocking pin may protrude from a forward and/or backward side of the body of the trailer hitch, which may be configured for manual actuation into the release position.

In an embodiment of the trailer hitch according to the first aspect, the blocking element is pivotably moveably attached to body of the trailer hitch. A pivotably moveably attached blocking element may be easier to actuate and/or easier to bias towards a blocking position. For example, the blocking element may be configured for adjustment into a release position with the same hand holding the tow element and/or drawbar during insertion into and/or retraction from the receiving space. The blocking element is moveable between a blocking position to adjust the retention device into the blocking state, wherein the blocking element at least partially blocks the aperture in the blocking position. The blocking element may be moveable between a blocking position to adjust the retention device into the blocking state, wherein the blocking element at least partially blocks the aperture in the blocking position, and a release position to adjust the retention device into the release state. For example, the blocking element may be pivoted between the blocking position and the release position. The blocking element may be configured as a blocking lever. The blocking lever may be mounted to the body with a pin around which the blocking lever can pivot. For example, the blocking lever may be mounted to the body of the trailer hitch above the aperture on the same side as the aperture.

In an embodiment of the trailer hitch according to the first aspect, a pivot axis of the blocking element extends in the forward-backwards direction, in particular when the trailer hitch is mounted to the bicycle. Hence, the blocking element may be configured to be adjusted from the blocking position into the release position by pushing in the same direction as is required for insertion of the tow element through the aperture. Adjustment of the blocking element may thus be very intuitive and also easy with the same hand that is holding the tow element and/or drawbar. For example, the pivot axis may extend parallel to the aperture of the body of the trailer hitch.

In an embodiment of the trailer hitch according to the first aspect, an actuation section of the blocking element extends beyond the body of the trailer hitch, for example in an upward direction, in particular an upward direction when the trailer hitch is mounted to the bicycle. In an embodiment of the trailer hitch according to the first aspect, a retention section of the blocking element is arranged in or adjacent to the aperture in the blocking position. The retention section and the actuation section may be arranged on opposite sides of the pivot axis and/or on opposite ends of the blocking element. An edge of the retention section may correspond in shape to a section of the tow element. For example, the edge is rounded and/or corresponds to spherical part of the tow element. The corresponding shape may facilitate adjustment of the blocking element into the release position when inserting the tow element through the aperture. Further, a design of the trailer hitch may be more compact due to the corresponding edge shape. For example, the edge of the retention section may be facing downwards in the blocking position. For example, the tow element may contact the edge of the retention section during insertion into the trailer hitch.

In an embodiment of the trailer hitch according to the first aspect, the retention device comprises a spring element biasing the blocking element towards the blocking position. The blocking element may thus be biased reliably and overall the trailer hitch may be compact and cost-effective. The spring may be mounted to the body of the trailer hitch.

In an embodiment of the trailer hitch according to the first aspect, the body of the trailer hitch forms an end stop for the blocking element in the blocking position. Hence, no additional parts forming an end stop may be needed. The body of the trailer may also form a robust end stop so that moving the blocking element beyond the blocking position can reliably be prevented. For example, a protruding or recessed portion of the body of the trailer hitch may form the end stop for the blocking position. The protruding portion may be integral to the rest of the body.

In an embodiment of the trailer hitch according to the first aspect, the body of the trailer hitch forms an end stop limiting a maximum displacement of the blocking element out of the blocking position. For example, such an end stop may define a maximum displacement towards the release position. This may reliably prevent jamming of the trailer hitch. The end stop may be configured for stopping the blocking element in the release position. For example, a protruding or recessed portion of the body of the trailer hitch may form the end stop for the release position. The protruding portion may be integral to the rest of the body. In an embodiment of the trailer hitch according to the first aspect, the body of the trailer hitch is configured to allow adjustment of the tow element in the receiving space between an aperture aligned orientation and a tug orientation. The aperture aligned orientation may be an orientation that allows insertion and/or extraction of the tow element. The aperture aligned position may correspond to an orientation needed for the tow element to be inserted through the aperture. In the aperture aligned orientation, the connection element and/or bar element of the drawbar may extend through the aperture and/or substantially in a left-right direction. A tug orientation may correspond to an orientation for towing the trailer with the bicycle. For example, the connection element and/or bar element of the drawbar may extend substantially backwards from the tow element in the tug orientation. In the aperture aligned orientation, the connection element and/or bar element of the drawbar may, for example, not extend through the aperture. The tow element and/or drawbar may be configured so that insertion and/or extraction through the aperture is possible in tug orientation as well, but only in the direction substantially parallel to the direction the aperture is facing.

In an embodiment of the trailer hitch according to the first aspect, the body of the trailer hitch comprises a through hole facing at least in the backward direction of the bicycle, in particular when the trailer hitch is mounted to the bicycle. This through hole may be connected to the aperture, for example with a slot, and/or may be formed as a slot. The slot may also connect the exterior with the receiving space. However, the slot and/or the through hole may be sized and/or shaped so that the tow element may not pass therethrough. The through hole may be smaller than the tow element. The drawbar of the trailer and/or the connection element may extend through the through hole in the tug position. The through hole may be larger than the connection element and/or bar element of the drawbar. The through hole may be configured as a slot extending through the whole body of the trailer hitch in a forward-backward direction of the bicycle when the trailer hitch is mounted to the bicycle. The through hole may extend through a back wall, forward wall and the receiving space. The through hole may form a hole at a forward side and backside of the body of the trailer. The through hole may thus easily be manufactured in one step, for example by drilling through the body of the trailer hitch completely in the forward-backward direction. Overall weight may thus also be low.

In an embodiment of the trailer hitch according to the first aspect, the trailer hitch comprises a safety device configured to provide a redundant connection of the trailer to the bicycle. The safety device may be configured to keep the trailer attached to the bicycle and/or trailer hitch in case of connection failure, in particular in case of the tow element disconnecting from the body of the trailer hitch. For example, when the blocking element and/or body of the trailer hitch brakes, the trailer may thus remain attached. Thus, uncontrolled movement of the trailer may be avoided. The redundant connection may not retain the connection fully functional but may only serve as a safety. For example, continuing the ride may not be possible if only the safety device keeps the trailer attached to the bicycle. For example, the safety device may be a simple strap that connects the trailer to the bicycle frame in addition to the body of the trailer hitch. Such a strap may catch the trailer in case of connection failure.

The safety device may comprise a first securing element configured for a connection of the body of the trailer hitch to a frame of the bicycle. The first securing element may thus provide a redundancy for the connection of the mounting of the body of the trailer hitch to the frame of the bicycle. For example, if a section of the body configured for mounting the trailer hitch to the rear axle of the bicycle brakes, the body may remain attached to the frame so that the bike can be brought to a stop together with the trailer.

The first securing element is configured to remain attached to the bicycle frame independently of an attachment of the trailer to the trailer hitch. It is therefore not necessary to attach and/or detach the first securing element with the trailer. The first securing element may be configured to remain permanently or at least attached to the frame of the bicycle for the same amount of time as the body of the trailer hitch remains attached to the frame of the bicycle. A situation where the user has forgotten to mount the first securing element can thus reliably be avoided. Further, mounting of the first securing element can be done with a clean bicycle just once. In addition, no means for comfortably detaching the first securing element may be needed.

For example, the first securing element may be connected to the rear seat stay or chain stay, which may be configured as a tube extending from the seat post tube towards the rear axle or a as a tube connecting the bottom bracket towards the rear axle, respectively. The first securing element may remain permanently attached to the frame of the bicycle or may be removably attached to the frame of the bicycle. The first securing element may be configured as a strap, in particular a textile strap. The first securing element may be configured as a cable, in particular a metal cable. The first securing element may be fixed to the body of the trailer hitch, for example with a screw. The first securing element may be configured to provide a closed loop around a tube of the frame of the bicycle. The safety device may be configured to secure connection of the trailer to the bicycle in case of connection failure between the body of the trailer hitch and the tow element. The first securing element may remain attached until the trailer hitch is dismounted from the bicycle and/or independently of the trailer being connected to the trailer hitch or not.

The safety device may comprise a tightening mechanism to tighten the first securing element around the frame of the bicycle. For example, the first securing element and/or the body of the trailer hitch may form a ratchet mechanism for tightening the first securing element around the frame of the bicycle. For example, the ratchet mechanism may be similar to the one of a cable tie.

In an embodiment of the trailer hitch according to the first aspect, the first securing element is configured as a first strap element. A strap element may be lightweight and can be easily adapted to a variety of bicycle frames. The first securing strap may be configured to be wrapped around a part of the frame of the bicycle. The first strap element may, for example, remain wrapped around the frame of the bicycle when the trailer hitch is mounted to the bicycle, in particular regardless of whether the trailer is attached to the trailer hitch and/or connected to the bicycle.

In an embodiment of the trailer hitch according to the first aspect, at least a first end of the first securing element is permanently fixed to the body of the trailer hitch. The first securing element is thus always available to secure the body of the trailer hitch. Moreover, a user can thus not forget to attach the first securing element to the body of the trailer hitch.

In an embodiment of the trailer hitch according to the first aspect, a second end of the first securing element is permanently fixed to the body of the trailer hitch or is configured to be removably attached to the body of the trailer hitch. In the first case, the safety device may be delivered with the second end of the first securing element not yet being fixed to the body of the trailer hitch. The second end of the first securing element may be fixed to the body of the trailer hitch once the trailer hitch is being mounted to the bicycle. Hence, accidently detachment of the second end and thus the first securing element can be avoided. Further, the first securing element can thus also provide a theft prevention function for the trailer hitch. Alternatively, the second end of the first securing element may also attach to a middle portion of the first securing element to form a loop.

In an embodiment of the trailer hitch according to the first aspect, the first securing element is configured to be wrapped around the frame of the bicycle, in particular when the trailer hitch is mounted to the bicycle. For example, the first securing element is configured as a flexible element.

In an embodiment of the trailer hitch according to the first aspect, the safety device comprises a second securing element configured for a removable connection of the trailer to the body of the trailer hitch and/or the first securing element and/or the frame of the bicycle. Hence, if the connection of the tow element to the body of the trailer hitch fails, the second securing element can keep the trailer attached to the bicycle so that both the bicycle and the trailer can be brought to a safe stop. For example, the second securing element may be configured to redundantly connect the drawbar to the body of the trailer hitch. In this case, the body may comprise attachment means for the second securing element such as a hook or eyelet, which may facilitate attachment and ensure connection. Alternatively or additionally, the second securing element may be configured to redundantly connect the drawbar to the frame of the bicycle and/or the first securing element. In this case, the trailer can remain connected to the bicycle in case of failure of the body of the trailer hitch.

In an embodiment of the trailer hitch according to the first aspect, the second securing element is configured as a second strap element.

In an embodiment of the trailer hitch according to the first aspect, a first end of the second securing element is permanently fixed to the body of the trailer hitch and/or the first securing element. The second securing element is thus easy to attach and cannot get lost.

In an embodiment of the trailer hitch according to the first aspect, a second end of the second securing element is configured to be removably attachable to the body of the trailer hitch and/or the first securing element and/or the trailer and/or the frame of the bicycle.

In an embodiment of the trailer hitch according to the first aspect, the body of the trailer hitch comprises an eyelet for attachment of the second end of the second securing element.

In an embodiment of the trailer hitch according to the first aspect, the second securing element comprises a snap hook. For example, the snap hook may form the end of the second securing element not permanently attached. The snap hook also allows quick and easy engagement of the second securing element. For example, a bar element of the drawbar of the trailer may comprise an eyelet for attachment of the second end of the second securing element.

In an embodiment of the trailer hitch according to the first aspect, a connection of the trailer to the body of the trailer hitch and/or the first securing element with the second securing element prohibits adjustment of the retention device from the blocking state to the release state. Hence, a user may need to first disengage the safety device before being able to disconnect the trailer from the bicycle. This may avoid situations where the user only detaches the tow element but not the redundant connection. Hence, a situation where the user believes the trailer to be detached, in which he might accidentally drag the trailer with the bicycle, may be avoided.

Alternatively or additionally, the connection of the trailer to the body of the trailer hitch and/or the first securing element with the second securing element prohibits adjustment of the retention device from the blocking state to the release state. Hence, a user may need to first engage the safety device before he may attach the tow element to the body of the trailer hitch. This may avoid that the user forgets to engage the safety device.

In an embodiment of the trailer hitch according to the first aspect, the trailer hitch comprises a locking device. For example, the locking device may comprise a locking cylinder. The locking device may be configured to prohibit adjustment of the retention device from the blocking state to the release state. Hence, theft of the trailer by detachment from the trailer hitch may be prevented. The locking device may be configured to prohibit removal of the trailer hitch from the bicycle. The locking device may be configured to prohibit disengagement of the safety device. For example, the locking device may block detachment of the first securing element and/or second securing element. The locking device may be adjustable between a locked state and an unlocked state. The unlocked state may permit adjustment of the retention device, permit removal of the trailer hitch and/or permit detachment of the safety device. For example, the locking device may comprise a key for adjusting the locking device. Alternatively or additionally, the locking device may be configured for unlocking by an RFID chip or a signal from an app of a smartphone.

A second aspect relates to a bicycle trailer system, which comprises a trailer and a trailer hitch according to the first aspect. Embodiments, examples and features of the first aspect constitute embodiments, examples and features of the second aspect and vice-versa. The trailer may comprise a drawbar and a tow element. The tow element may also form part of the drawbar. The drawbar may comprise a bar element and/or a connection element. The connection element may form a connection between the tow element and the bar element. The connection element and the tow element may be integrally formed by one unitarian metal element. The trailer may comprise a trailer body configured for passengers and/or cargo. The trailer may comprise one or more wheels, which may be configured to support the trailer body. The drawbar may be attached to a front of the trailer body. The bicycle trailer system may also comprise the bicycle.

In an embodiment of the system according to the second aspect, a first end of the second securing element is permanently fixed to the trailer. For example, the first end of the second securing element may be permanently attached to the drawbar. The second securing element may thus remain with the trailer. Thus, no loose end of a securing element will remain on the trailer hitch when the trailer is not connected. The second securing element may also form a part of the trailer in this case. The safety device may thus comprise parts of the trailer hitch and the trailer.

In an embodiment of the system according to the second aspect, a second end of the second securing element is configured to be removably attachable to the body of the trailer hitch and/or the first securing element and/or the trailer and/or the frame of the bicycle.

In an embodiment of the system according to the second aspect, the trailer comprises an eyelet for attachment of the second end of the second securing element. For example, the eyelet may be arranged on the drawbar to allow easy and quick connection and disconnection of the second securing element, in particular with a snap hook.

In an embodiment of the system according to the second aspect, the trailer comprises a trailer retention device adjustable between a blocking state blocking movement of the tow element through the aperture and a release state allowing movement of the tow element through the aperture. The trailer retention device may provide the same functions as the retention device of the trailer hitch. The trailer retention device may be provided in addition or as an alternative to the retention device of the trailer hitch. For example, the trailer retention device may be formed by the drawbar, in particular a connection element between a bar element of the drawbar and the tow element, and/or may be arranged on the drawbar.

In an embodiment of the system according to the second aspect, the trailer retention device is biased towards the blocking state, for example with a spring.

In an embodiment of the system according to the second aspect, the trailer retention device is formed by the tow element and the bar element of the trailer, wherein the tow element is rotatable relative to the bar element for adjustment of the trailer retention device between the blocking state and the release state. Such a configuration may be compact and robust. For example, a bearing for the tow element may be housed in the bar element. Further, such a configuration may be configured for adjustment into the release state by a hand of a user also holding the drawbar. Hence, one-handed connection and disconnection of the trailer to the trailer hitch may be facilitated. The axis of rotation may extend through the bar element, in particular through an end of the bar element adjacent the tow element. The bar element may be configured for retrofit to a trailer not having the retention device.

In an embodiment of the system according to the second aspect, the tow element can pass through the aperture in a first orientation. In an embodiment of the system according to the second aspect, the tow element cannot pass through the aperture in a second orientation. For example, the tow element needs to be twisted in a certain orientation relative to the bar element so that it can be inserted through the aperture, in particular when the trailer is standing on the ground.

In an embodiment of the system according to the second aspect, the trailer retention device comprises a spring element biasing the tow element towards the second orientation. The spring element may be housed in the bar element.

In an embodiment of the system according to the second aspect, the tow element comprises an actuation section for twisting the tow element with a finger of a hand holding the drawbar. For example, the tow element may comprise a protrusion that may be pushed by a finger of the hand holding the bar element to rotate the tow element relative to the bar element. The protrusion may extend along the axis of rotation of the tow element relative to the bar element. The protrusion may still be arranged outside the receiving space of the trailer hitch when the tow element is inserted into the receiving element for connecting the trailer to the bicycle.

In an embodiment of the system according to the second aspect, the tow element has at least one protrusion or groove on a non-spherical section of the tow element that corresponds to a groove or protrusion in a wall of the body of the trailer hitch limiting the aperture. The protrusion and/or groove may signal to the user which orientation is needed for insertion, facilitating use of the system.

In an embodiment of the system according to the second aspect, the tow element has at least one non-spherical side that is configured for insertion into the receiving space. For example, the non-spherical side may be a planar side. For example, the tow element may be configured as a ball with one or more flat sides.

In an embodiment of the system according to the second aspect, an axis of rotation extends along a longitudinal extension of a section of the drawbar adjacent to the tow element.

In an embodiment of the system according to the second aspect, the system is configured for one handed attachment of the trailer to the trailer hitch. In an embodiment of the system according to the second aspect, the system is configured for one handed detachment of the trailer from the trailer hitch. Hence, a second hand of the user may be used for stabilizing the bicycle during connection of the trailer and/or to hold something.

A third aspect relates to a trailer hitch for releasably connecting a trailer to a bicycle. The trailer hitch according to the third aspect may comprise features, examples and embodiments of the first aspect and vice-versa. The trailer hitch comprises a body configured for attachment of the trailer to the trailer hitch and configured for mounting to the bicycle. The trailer hitch comprises a safety device configured to provide a redundant connection of the trailer to the bicycle. The safety device may have the features and/or functions described for the safety device of the trailer hitch of the first aspect and/or of the system according to the second aspect. The safety device may comprise a first securing element configured for a connection of the body of the trailer hitch to a frame of the bicycle. The first securing element may be configured to remain attached to the bicycle frame independently of an attachment of the trailer to the trailer hitch.

The body may be configured for receiving a tow element of the trailer. Alternatively, the trailer hitch may comprise other attachment means, such as a ball or pin that is inserted into a receiving space of the trailer. The trailer hitch according to the third aspect may be configured for mounting to an axle of the bicycle, a frame of the bicycle or to a seat post. The connection of the body of the trailer hitch according to the third aspect to the frame via the first securing element may be in addition to the mounting of the body of the trailer hitch according to the third aspect to a rear part of the bicycle.

Item Lists

The following item lists relate to further embodiments, examples and features.

Item List A

A1. Trailer hitch (10) for releasably connecting a trailer to a bicycle,
 wherein the trailer hitch (10) is configured for arrangement at a rear of the bicycle and
 wherein the trailer hitch (10) comprises a body (14) with a receiving space configured for receiving a tow element (18; 200) attachable to a drawbar of the trailer and an aperture (22) configured for inserting the tow element (18; 200) into the receiving space,
 wherein the aperture (22) is facing in a direction transversal to a forward-backward direction of the bicycle and wherein the tow element (18; 200) can only be inserted into the receiving space through the aperture (22) in a direction substantially parallel to the direction the aperture (22) is facing.

A2. Trailer hitch (10) according to item A1,
 wherein the trailer hitch (10) forms a part of the bicycle and/or
 wherein the trailer hitch (10) is configured for mounting to a rear part of the bicycle in the form of a rear axle (300) of the bicycle and/or
 wherein the tow element (18; 200) is at least partially ball-shaped and/or
 wherein the tow element (18; 200) may be inserted into the receiving space only through the aperture (22) and/or wherein the aperture (22) is facing in a direction parallel to a longitudinal direction of the rear axle (300) of the bicycle and/or
 wherein the aperture (22) is facing in a direction essentially perpendicular to the forward-backward direction of the bicycle and/or
 wherein the aperture (22) is facing away from a rear tire of the bicycle and/or
 wherein the aperture (22) is larger than the tow element (18; 200) and/or
 wherein the aperture (22) is configured for insertion of the tow element (18; 200) along the direction transversal to a forward-backward direction of the bicycle and/or
 wherein the body (14) of the trailer hitch (10) is configured to block insertion of the tow element (18; 200) into the receiving space besides through the aperture (22) and/or
 wherein the body (14) of the trailer hitch (14) is configured to block extraction of the tow element (18; 200) from the receiving space besides through the aperture (22) and/or
 wherein the receiving space at least partially corresponds in shape to a shape of the tow element (18; 200) and/or
 wherein the receiving space is configured to cause self-centering of the tow element (18; 200) in the receiving space and/or
 wherein the trailer hitch (10) is configured to prevent or reduce movement of the tow element (18; 200) arranged in the receiving space in the forward-backward direction of the bicycle and/or
 wherein a size of the receiving space in the forward-backward direction of the bicycle corresponds to a size of the tow element (18; 200).

A3. Trailer hitch (10) according to item A1 or A2,
 wherein the trailer hitch (10) comprises a retention device adjustable between a blocking state blocking movement of the tow element (18; 200) through the aperture (22) and a release state allowing movement of the tow element (18; 200) through the aperture (22),
 wherein the retention device is biased towards the blocking state and/or
 wherein the retention device is configured to self-adjust into the release state when the tow element (18; 200) is inserted into the receiving space through the aperture (22) and/or
 wherein the retention device is configured to block adjustment into the release state without previous adjustment of the retention device into the release state
 when trying to extract the tow element (18; 200) from the receiving space through the aperture (22) and/or
 when the tow element (18; 200) arranged in the receiving space is moved towards the aperture (22).

A4. Trailer hitch (10) according to item A3,
 wherein the retention device comprises a blocking element (24) transversally and/or pivotably moveably attached to the body (14) of the trailer hitch (10),
 wherein the blocking element (24) is moveable between a blocking position to adjust the retention device into the blocking state, wherein the blocking element (24) at least partially blocks the aperture (22) in the blocking position, and a release position to adjust the retention device into the release state, in particular wherein a pivot axis of the blocking element (124) extends in the forward-backwards direction and/or parallel to the aperture (22) and/or in particular wherein an actuation section (136) of the blocking element (124) extends beyond the body (14) of the trailer hitch (10) and/or in particular wherein a retention section (128) of the blocking element (124) is arranged in or adjacent to the aperture (22) in the blocking position, wherein an edge (138) of the retention section (128) corresponds in shape to a section of the tow element (18; 200).

A5. Trailer hitch (10) according to item A4, wherein the retention device comprises a spring element (135) biasing the blocking element (24, 124) towards the blocking position and/or wherein the body (14) of the trailer hitch forms (10) an end stop (132) for the blocking element (124) in the blocking position and/or wherein the body (14) of the trailer hitch (10) forms an end stop limiting a maximum displacement of the blocking element (124) out of the blocking position.

A6. Trailer hitch (10) according to any one of the preceding items A1 to A5, wherein the body (14) of the trailer hitch (10) is configured to allow adjustment of the tow element (18; 200) in the receiving space between an aperture aligned orientation and a tug orientation, in particular wherein the body (14) of the trailer hitch (10) comprises a through hole (166, 170) facing at least in the backward direction of the bicycle, wherein the through hole (166, 170) is smaller than the tow element (18; 200) and wherein the drawbar of the trailer extends through the through hole (166, 170) in the tug position.

A7. Trailer hitch (10) according to any one of the preceding items A1 to A6, wherein the trailer hitch (10) comprises a safety device configured to provide a redundant connection of the trailer to the bicycle, wherein the safety device comprises a first securing element (302) configured for a connection of the body (14) of the trailer hitch (10) to a frame of the bicycle, wherein the first securing element (302) is configured to remain attached to the bicycle frame independently of an attachment of the trailer to the trailer hitch (10), in particular wherein the first securing element (302) is configured as a first strap element, and/or in particular wherein at least a first end of the first securing element (302) is permanently fixed to the body (14) of the trailer hitch (10) and/or in particular wherein a second end of the first securing element (302) is permanently fixed to the body (14) of the trailer hitch (10) or is configured to be removably attached to the body (14) of the trailer hitch (10) and/or in particular wherein the first securing element (302) is configured to be wrapped around the frame of the bicycle.

A8. Trailer hitch (10) according to item A7, wherein the safety device comprises a second securing element (308) configured for a removable connection of the trailer to the body (14) of the trailer hitch (10) and/or the first securing element (302) and/or the frame of the bicycle.

A9. Trailer hitch (10) according to item A7 or A8, wherein the second securing element (308) is configured as a second strap element and/or wherein a first end of the second securing element (308) is permanently fixed to the body (14) of the trailer hitch (10) and/or the first securing element (302) and/or wherein a second end of the second securing element (308 is configured to be removably attachable to the body (14) of the trailer hitch (10) and/or the first securing element (302) and/or the trailer and/or the frame of the bicycle and/or wherein the body (14) of the trailer hitch (10) comprises an eyelet (316) for attachment of the second end of the second securing element (308) and/or wherein the second securing element (308) comprises a snap hook (310) and/or wherein a connection of the trailer to the body (14) of the trailer hitch (10) and/or the first securing element (302) with the second securing element (304) prohibits adjustment of the retention device from the blocking state to the release state.

A10. Trailer hitch (10) according to any one of the preceding items A1 to A9, wherein the trailer hitch (10) comprises a locking device (150) configured to prohibit adjustment of the retention device from the blocking state to the release state and/or configured to prohibit removal of the trailer hitch (10) from the bicycle and/or configured to prohibit disengagement of the safety device.

A11. Bicycle trailer system comprising a trailer and a trailer hitch (10) according to any one of the preceding items A1 to A10.

A12. System according to item A11 when referring back to any one of items A7 to A9, wherein a first end of the second securing element (308) is permanently fixed to the trailer and/or wherein a second end of the second securing element (308) is configured to be removably attachable to the body (14) of the trailer hitch (10) and/or the first securing element (302) and/or the trailer and/or the frame of the bicycle and/or wherein the trailer comprises an eyelet for attachment of the second end of the second securing element (308).

A13. System according to item A11 or A12, wherein the trailer comprises a trailer retention device adjustable between a blocking state blocking movement of the tow element (200) through the aperture (22) and a release state allowing movement of the tow element (200) through the aperture (22), in particular wherein the trailer retention device is biased towards the blocking state, and/or in particular wherein the trailer retention device is formed by the tow element (200) and bar element (202) of the trailer, wherein the tow element (200) is rotatable relative to the bar element (202) for adjustment of the trailer retention system between the blocking state and the release state.

A14. System according to item A13,
- wherein the tow element (200) can pass through the aperture (22) in a first orientation and/or
- wherein the tow element (200) cannot pass through the aperture in a second orientation and/or
- wherein the trailer retention device comprises a spring element biasing the tow element (200) towards the second orientation and/or
- wherein the tow element (200) comprises an actuation section (212) for twisting the tow element (200) with a finger of a hand holding the drawbar and/or
- wherein the tow element (200) has at least one protrusion (206) or groove on a non-spherical section (208) of the tow element (200) that corresponds to a groove (210) or protrusion in a wall of the body (14) of the trailer hitch (10) limiting the aperture (22) and/or
- wherein the tow element (200) has at least one non-spherical side (208) that is configured for insertion into the receiving space and/or
- wherein an axis of rotation extends along a longitudinal extension of a section of the drawbar adjacent to the tow element (200).

A15. System according to any one of items A11 to A14,
- wherein the system is configured for one handed attachment of the trailer to the trailer hitch (10) and/or
- wherein the system is configured for one handed detachment of the trailer from the trailer hitch (10).

Item List B

B1. Trailer hitch (10) for releasably connecting a trailer to a bicycle,
- wherein the trailer hitch (10) is configured for arrangement at a rear of the bicycle and
- wherein the trailer hitch (10) comprises a body (14) with a receiving space configured for receiving a tow element (18; 200) attachable to a drawbar of the trailer and an aperture (22) configured for inserting the tow element (18; 200) into the receiving space,
- wherein the aperture (22) is facing in a direction transversal to a forward-backward direction of the bicycle and wherein the tow element (18; 200) can only be inserted into the receiving space through the aperture (22) in a direction substantially parallel to the direction the aperture (22) is facing.

B2. Trailer hitch (10) according to item B1,
- wherein the trailer hitch (10) forms a part of the bicycle and/or
- wherein the trailer hitch (10) is configured for mounting to a rear part of the bicycle in the form of a rear axle (300) of the bicycle and/or
- wherein the tow element (18; 200) is at least partially ball-shaped and/or
- wherein the tow element (18; 200) may be inserted into the receiving space only through the aperture (22) and/or
- wherein the aperture (22) is facing in a direction parallel to a longitudinal direction of the rear axle (300) of the bicycle and/or
- wherein the aperture (22) is facing in a direction essentially perpendicular to the forward-backward direction of the bicycle and/or
- wherein the aperture (22) is facing away from a rear tire of the bicycle and/or
- wherein the aperture (22) is larger than the tow element (18; 200) and/or
- wherein the aperture (22) is configured for insertion of the tow element (18; 200) along the direction transversal to a forward-backward direction of the bicycle and/or
- wherein the body (14) of the trailer hitch (10) is configured to block insertion of the tow element (18; 200) into the receiving space besides through the aperture (22) and/or
- wherein the body (14) of the trailer hitch (14) is configured to block extraction of the tow element (18; 200) from the receiving space besides through the aperture (22) and/or
- wherein the receiving space at least partially corresponds in shape to a shape of the tow element (18; 200) and/or
- wherein the receiving space is configured to cause self-centering of the tow element (18; 200) in the receiving space and/or
- wherein the trailer hitch (10) is configured to prevent or reduce movement of the tow element (18; 200) arranged in the receiving space in the forward-backward direction of the bicycle and/or
- wherein a size of the receiving space in the forward-backward direction of the bicycle corresponds to a size of the tow element (18; 200).

B3. Trailer hitch (10) according to items B1 or B2,
- wherein the trailer hitch (10) comprises a retention device adjustable between a blocking state blocking movement of the tow element (18; 200) through the aperture (22) and a release state allowing movement of the tow element (18; 200) through the aperture (22),
- wherein the retention device is biased towards the blocking state.

B4. Trailer hitch (10) according to item B3,
- wherein the retention device is configured to self-adjust into the release state when the tow element (18; 200) is inserted into the receiving space through the aperture (22).

B5. Trailer hitch (10) according to item B3 or B4,
- wherein the retention device is configured to block adjustment into the release state without previous adjustment of the retention device into the release state
- when trying to extract the tow element (18; 200) from the receiving space through the aperture (22) and/or
- when the tow element (18; 200) arranged in the receiving space is moved towards the aperture (22).

B6. Trailer hitch (10) according to any one of items B3 to B5,
- wherein the retention device comprises a blocking element (24) transversally moveably attached to the body (14) of the trailer hitch (10),
- wherein the blocking element (24) is moveable between a blocking position to adjust the retention device into the blocking state, wherein the blocking element (24) at least partially blocks the aperture (22) in the blocking position,
- and a release position to adjust the retention device into the release state.

B7. Trailer hitch (10) according to any one of items B3 to B5,
- wherein the retention device comprises a blocking element (124) pivotably moveably attached to body of the trailer hitch,
- wherein the blocking element (124) is moveable between a blocking position to adjust the retention device into the blocking state, wherein the blocking element (124) at least partially blocks the aperture (22) in the blocking position,
and a release position to adjust the retention device into the release state.

B8. Trailer hitch (10) according to item B7,
wherein a pivot axis of the blocking element (124) extends in the forward-backwards direction and/or parallel to the aperture (22) and/or
wherein an actuation section (136) of the blocking element (124) extends beyond the body (14) of the trailer hitch (10) and/or
wherein a retention section (128) of the blocking element (124) is arranged in or adjacent to the aperture (22) in the blocking position, wherein an edge (138) of the retention section (128) corresponds in shape to a section of the tow element (18; 200).

B9. Trailer hitch (10) according to any one of items B6 to B8,
wherein the retention device comprises a spring element (135) biasing the blocking element (24, 124) towards the blocking position and/or
wherein the body (14) of the trailer hitch forms (10) an end stop (132) for the blocking element (124) in the blocking position and/or
wherein the body (14) of the trailer hitch (10) forms an end stop limiting a maximum displacement of the blocking element (124) out of the blocking position.

B10. Trailer hitch (10) according to any one of the preceding items,
wherein the body (14) of the trailer hitch (10) is configured to allow adjustment of the tow element (18; 200) in the receiving space between an aperture aligned orientation and a tug orientation.

B11. Trailer hitch (10) according to item B10,
wherein the body (14) of the trailer hitch (10) comprises a through hole (166, 170) facing at least in the backward direction of the bicycle,
wherein the through hole (166, 170) is smaller than the tow element (18; 200) and
wherein the drawbar of the trailer extends through the through hole (166, 170) in the tug position.

B12. Trailer hitch (10) according to any one of the preceding items B,
wherein the trailer hitch (10) comprises a safety device configured to provide a redundant connection of the trailer to the bicycle,
wherein the safety device comprises a first securing element (302) configured for a connection of the body (14) of the trailer hitch (10) to a frame of the bicycle,
wherein the first securing element (302) is configured to remain attached to the bicycle frame independently of an attachment of the trailer to the trailer hitch (10).

B13. Trailer hitch (10) according to item B12,
wherein the first securing element (302) is configured as a first strap element, and/or
wherein at least a first end of the first securing element (302) is permanently fixed to the body (14) of the trailer hitch (10) and/or
wherein a second end of the first securing element (302) is permanently fixed to the body (14) of the trailer hitch (10) or is configured to be removably attached to the body (14) of the trailer hitch (10) and/or
wherein the first securing element (302) is configured to be wrapped around the frame of the bicycle.

B14. Trailer hitch (10) according to items B12 or B13,
wherein the safety device comprises a second securing element (308) configured for a removable connection of the trailer to the body (14) of the trailer hitch (10) and/or the first securing element (302) and/or the frame of the bicycle.

B15. Trailer hitch (10) according to any one of items B12 to B14,
wherein the second securing element (308) is configured as a second strap element and/or
wherein a first end of the second securing element (308) is permanently fixed to the body (14) of the trailer hitch (10) and/or the first securing element (302) and/or
wherein a second end of the second securing element (308 is configured to be removably attachable to the body (14) of the trailer hitch (10) and/or the first securing element (302) and/or the trailer and/or the frame of the bicycle and/or
wherein the body (14) of the trailer hitch (10) comprises an eyelet (316) for attachment of the second end of the second securing element (308) and/or
wherein the second securing element (308) comprises a snap hook (310) and/or
wherein a connection of the trailer to the body (14) of the trailer hitch (10) and/or the first securing element (302) with the second securing element (304) prohibits adjustment of the retention device from the blocking state to the release state.

B16. Trailer hitch (10) according to any one of the preceding items B,
wherein the trailer hitch (10) comprises a locking device (150)
configured to prohibit adjustment of the retention device from the blocking state to the release state and/or
configured to prohibit removal of the trailer hitch (10) from the bicycle and/or
configured to prohibit disengagement of the safety device.

B17. Bicycle trailer system comprising a trailer and a trailer hitch (10) according to any one of the preceding items B.

B18. System according to item B17 when referring back to any one of items B14 to B16,
wherein a first end of the second securing element (308) is permanently fixed to the trailer and/or
wherein a second end of the second securing element (308) is configured to be removably attachable to the body (14) of the trailer hitch (10) and/or the first securing element (302) and/or the trailer and/or the frame of the bicycle and/or
wherein the trailer comprises an eyelet for attachment of the second end of the second securing element (308).

B19. System according to items B17 or B18,
wherein the trailer comprises a trailer retention device adjustable between a blocking state blocking movement of the tow element (200) through the aperture (22) and a release state allowing movement of the tow element (200) through the aperture (22),
wherein the trailer retention device is biased towards the blocking state.

B20. System according to item B19,
- the trailer retention device is formed by the tow element (200) and bar element (202) of the trailer,
- wherein the tow element (200) is rotatable relative to the bar element (202) for adjustment of the trailer retention system between the blocking state and the release state.

B21. System according to item B20,
- wherein the tow element (200) can pass through the aperture (22) in a first orientation and/or
- wherein the tow element (200) cannot pass through the aperture in a second orientation and/or
- wherein the trailer retention device comprises a spring element biasing the tow element (200) towards the second orientation and/or
- wherein the tow element (200) comprises an actuation section (212) for twisting the tow element (200) with a finger of a hand holding the drawbar and/or
- wherein the tow element (200) has at least one protrusion (206) or groove on a non-spherical section (208) of the tow element (200) that corresponds to a groove (210) or protrusion in a wall of the body (14) of the trailer hitch (10) limiting the aperture (22) and/or
- wherein the tow element (200) has at least one non-spherical side (208) that is configured for insertion into the receiving space and/or
- wherein an axis of rotation extends along a longitudinal extension of a section of the drawbar adjacent to the tow element (200).

B22. System according to any one of items B17 to B21,
- wherein the system is configured for one handed attachment of the trailer to the trailer hitch (10) and/or
- wherein the system is configured for one handed detachment of the trailer from the trailer hitch (10).

Item List C

C1. Trailer hitch (10) for releasably connecting a trailer to a bicycle,
- wherein the trailer hitch (10) comprises a body (14) configured for attachment of the trailer to the trailer hitch (10) and configured for mounting to the bicycle,
- wherein the trailer hitch (10) comprises a safety device configured to provide a redundant connection of the trailer to the bicycle,
- wherein the safety device comprises a first securing element (302) configured for a connection of the body (14) of the trailer hitch (10) to a frame of the bicycle
- wherein the first securing element (302) is configured to remain attached to the bicycle frame independently of an attachment of the trailer to the trailer hitch (10).

C2. Trailer hitch (10) according to item C1,
- wherein the first securing element (302) is configured as a first strap element, and/or
- wherein at least a first end of the first securing element (302) is permanently fixed to the body (14) of the trailer hitch (10) and/or
- wherein a second end of the first securing element (302) is permanently fixed to the body (14) of the trailer hitch or is configured to be removably attached to the body (14) of the trailer hitch (10) and/or
- wherein the first securing element (302) is configured to be wrapped around the frame of the bicycle.

C3. Trailer hitch (10) according to item C1 or C2,
- wherein the safety device comprises a second securing element (308) configured for a removable connection of the trailer to the body (14) of the trailer hitch (10) and/or the first securing element (302) and/or the frame of the bicycle.

C4. Trailer hitch (10) according to any one of the preceding items C,
- wherein the second securing element (308) is configured as a second strap element and/or
- wherein a first end of the second securing element (308) is permanently fixed to the body (14) of the trailer hitch (10) and/or the first securing element (302) and/or the frame of the bicycle and/or
- wherein a second end of the second securing element (308) is configured to be removably attachable to the body (14) of the trailer hitch (10) and/or the first securing element (302) and/or the trailer and/or the frame of the bicycle and/or
- wherein the body (14) of the trailer hitch (10) comprises an eyelet (316) for attachment of the second end of the second securing element (308) and/or
- wherein the second securing element (308) comprises a snap hook (310) and/or
- wherein a connection of the trailer to the body (14) of the trailer hitch (10) and/or the first securing element (302) with the second securing element (308) prohibits adjustment of a retention device from a blocking state to a release state.

C5. Trailer hitch (10) according to any one of the preceding items C,
- wherein the trailer hitch (10) is configured for mounting to a rear part of the bicycle and
- wherein the body (14) of the trailer hitch (10) has a receiving space configured for receiving a tow element (18; 200) attachable to a drawbar of the trailer and an aperture (22) configured for inserting the tow element (18; 200) into the receiving space,
- wherein the aperture (22) is facing in a direction transversal to a forward-backward direction of the bicycle and wherein the tow element (18; 200) may only be inserted into the receiving space through the aperture (22) in a direction substantially parallel to the direction the aperture (22) is facing.

C6. Trailer hitch (10) according to item C5,
- wherein the rear part is the rear axle (300) and/or
- wherein the tow element (18; 200) is at least partially ball-shaped and/or
- wherein the tow element (18; 200) may be inserted into the receiving space only through the aperture (22) and/or
- wherein the aperture (22) is facing in a direction parallel to a longitudinal direction of the rear axle (300) of the bicycle and/or
- wherein the aperture (22) is facing in a direction essentially perpendicular to the forward-backward direction of the bicycle and/or
- wherein the aperture (22) is facing away from a rear tire of the bicycle and/or
- wherein the aperture (22) is larger than the tow element (18; 200) and/or
- wherein the aperture (22) is configured for insertion of the tow element (18; 200) along the direction transversal to a forward-backward direction of the bicycle and/or wherein the body (14) of the trailer hitch (10) is configured to block insertion of the tow element (18; 200) into the receiving space besides through the aperture (22) and/or wherein the body (14) of the trailer hitch (10) is configured to block extraction of the tow element (18; 200) from the receiving space besides through the aperture (22) and/or the receiving space at least partially corresponds in shape to a shape of the tow element (18; 200) and/or the receiving space is configured to cause self-centering of the tow element (18; 200) in the receiving space.

C7. Trailer hitch (10) according to item C5 or C6, wherein the trailer hitch (10) comprises a retention device adjustable between a blocking state blocking movement of the tow element (18; 200) through the aperture (22) and a release state allowing movement of the tow element (18; 200) through the aperture (22), wherein the retention device is biased towards the blocking state.

C8. Trailer hitch (10) according to item C7, wherein the retention device is configured to self-adjust into the release state when the tow element (18; 200) is inserted into the receiving space through the aperture (22).

C9. Trailer hitch (10) according to item C7 or C8, wherein the retention device is configured to block adjustment into the release state without previous adjustment of the retention device into the release state when trying to extract the tow element (18; 200) from the receiving space through the aperture (22) and/or when the tow element (18; 200) arranged in the receiving space is moved towards the aperture (22).

C10. Trailer hitch (10) according to any one of items C7 to C9, wherein the retention device comprises a blocking element (24) transversally moveably attached to body (14) of the trailer hitch (10), wherein the blocking element (24) is moveable between a blocking position to adjust the retention device into the blocking state, wherein the blocking element at least partially blocks the aperture (22) in the blocking position, and a release position to adjust the retention device into the release state.

C11. Trailer hitch (10) according to any one of items C7 to C9, wherein the retention device comprises a blocking element (124) pivotably moveably attached to body (14) of the trailer hitch (10), wherein the blocking element (124) is moveable between a blocking position to adjust the retention device into the blocking state, wherein the blocking element (124) at least partially blocks the aperture (22) in the blocking position, and a release position to adjust the retention device into the release state.

C12. Trailer hitch (10) according to item C11, a pivot axis of the blocking element (124) extends in the forward-backwards direction and/or an actuation section (136) of the blocking element (124) extends beyond the body (14) of the trailer hitch (10) and/or a retention section (128) of the blocking element (124) is arranged in or adjacent to the aperture (22) in the blocking position, wherein an edge (138) of the retention section (128) corresponds in shape to a section of the tow element (18; 200).

C13. Trailer hitch (10) according to any one of items C10 to C12, wherein the retention device comprises a spring element (135) biasing the blocking element (24, 124) towards the blocking position and/or the body (14) of the trailer hitch (10) forms an end stop (132) for the blocking element (124) in the blocking position and/or the body (14) of the trailer hitch (10) forms an end stop limiting a maximum displacement of the blocking element (124) out of the blocking position.

C14. Trailer hitch (10) according to any one of the preceding items C, wherein the body (14) of the trailer hitch (14) is configured to allow adjustment of the tow element (18; 200) in the receiving space between an aperture aligned orientation and a tug orientation.

C15. Trailer hitch (10) according to item C14, wherein the body (14) of the trailer hitch (10) comprises a through hole (166, 170) facing at least in the backward direction of the bicycle, wherein the through hole (166, 170) is smaller than the tow element (18; 200) and wherein the drawbar of the trailer extends through the through hole (166, 170) in the tug position.

C16. Trailer hitch (10) according to any one of the preceding items C, wherein the trailer hitch (10) comprises a locking device (150)

configured to prohibit adjustment of the retention device from the blocking state to the release state and/or configured to prohibit removal of the trailer hitch (10) from the bicycle and/or configured to prohibit detachment of the safety device.

C17. Bicycle trailer system comprising a trailer and a trailer hitch (10) according to any one of the preceding items C.

C18. System according to item C17, wherein a first end of the second securing element (308) is permanently fixed to the trailer and/or wherein a second end of the second securing element (308) is configured to be removably attachable to the body (14) of the trailer hitch (10) and/or the first securing element (302) and/or the trailer and/or wherein the trailer comprises an eyelet for attachment of the second end of the second securing element (308).

C19. System according to item C17 or C18, wherein the trailer comprises a retention device adjustable between a blocking state blocking movement of the tow element (200) through the aperture (22) and a release state allowing movement of the tow element (200) through the aperture (22), wherein the trailer retention device of the trailer is biased towards the blocking state.

C20. System according to item C19, the trailer retention system is formed by the tow element (200) and bar element (202) of the trailer, wherein the tow element (200) is rotatable relative to the bar element (202) for adjustment of the trailer retention system between the blocking state and the release state.

C21. System according to item C20,
wherein the tow element (200) can pass through the aperture (22) in a first orientation and/or
wherein the tow element (200) cannot pass through the aperture (22) in a second orientation and/or
wherein the trailer retention device comprises a spring element biasing the tow element (200) towards the second orientation and/or
wherein the tow element (200) comprises an actuation section (212) for twisting the tow element (200) with a finger of a hand holding the drawbar and/or
wherein the tow element (200) has at least one protrusion (206) or groove on a non-spherical section (208) of the tow element (200) that corresponds to a groove (210) or protrusion in a wall of the body (14) of the trailer hitch (10) limiting the aperture (22) and/or
wherein the tow element (200) has at least one non-spherical side (208) that is configured for insertion into the receiving space and/or
wherein an axis of rotation extends along a longitudinal extension of a section of the drawbar adjacent to the tow element (200).

C22. System according to any one of items C17 to C21,
wherein the system is configured for one handed attachment of the trailer to the trailer hitch (10) and/or
wherein the system is configured for one handed detachment of the trailer from the trailer hitch (10).

DETAILED DESCRIPTION

Figure 1:
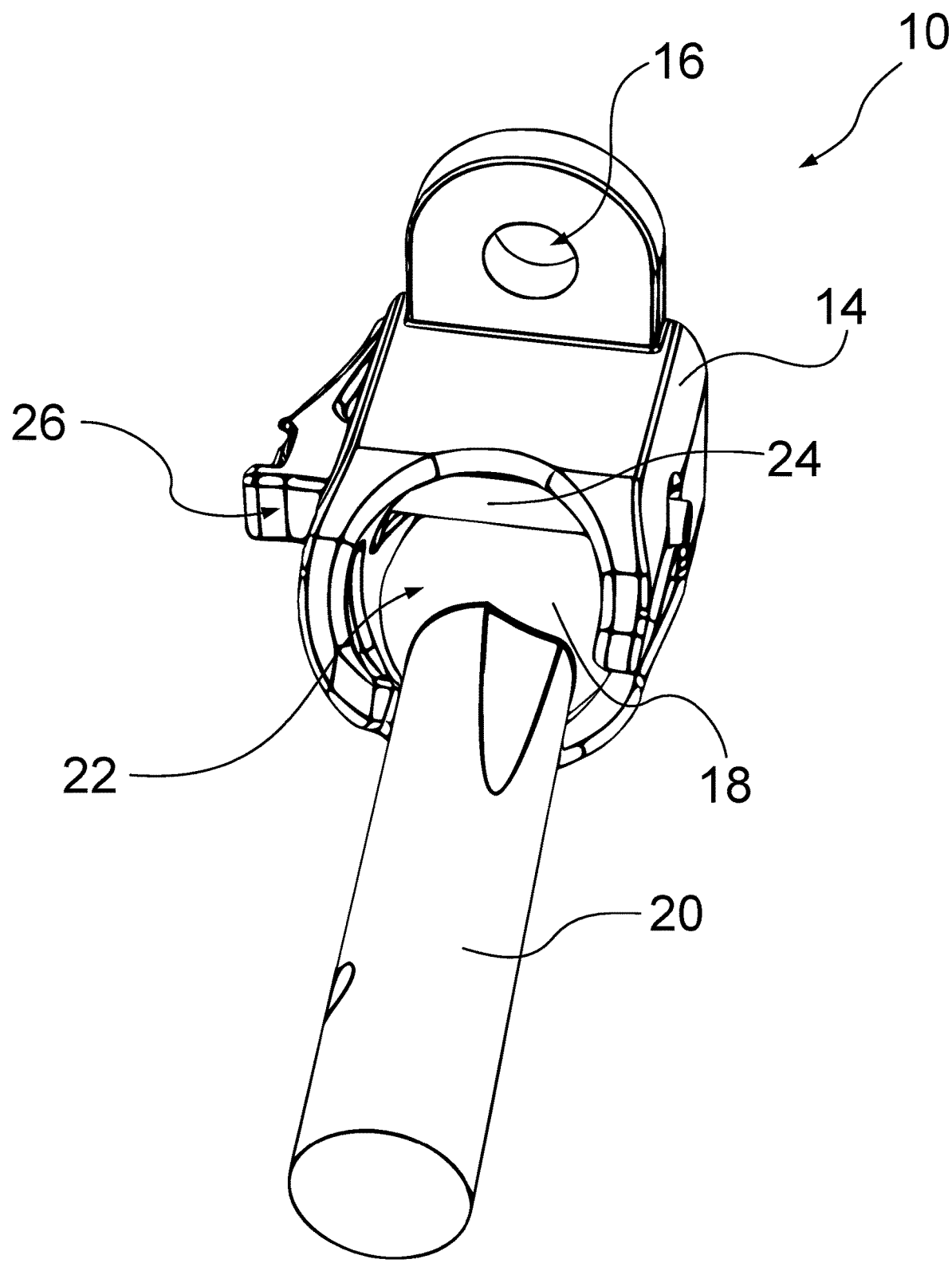
FIG. 1 illustrates a first embodiment of a trailer hitch for releasably connecting a trailer to a bicycle in a perspective view, wherein a tow element is inserted into a receiving space of a body of the trailer hitch in an aperture aligned orientation.

FIG. 1 illustrates a first embodiment of a trailer hitch 10 for releasably connecting a trailer to a bicycle. The trailer hitch 10 comprises a body 14, which is formed by a unitarian one-piece metal part. The body 14 forms a protrusion at a top side with a through hole 16. To mount the trailer hitch 10 to a bicycle, a rear axle is arranged in the through hole 16 so that the trailer hitch 10 may be secured to a left side of a frame of the bicycle. Such a mounted position is shown for another embodiment in FIG. 20.

The body 14 forms a receiving portion configured for receiving a tow element 18. In FIG. 1, the tow element 18 is shown arranged in the receiving space of the body 14. The tow element 18 is configured as a tow ball, which has an essentially spherical shape. Connected to the tow element 18 is a connection element 20. The connection element 20 and the tow element 18 are provided by a unitarian metal part. The connection element 20 therefore may be considered as forming an integral part of the tow element 18. The connection element 20 may be connected to a bar element of a drawbar of trailer for the bicycle.

The body 14 has an aperture 22 facing perpendicular to a forward-backward direction of the bicycle in the left direction when the trailer hitch 10 is mounted to the left side of the bicycle. When the bicycle is standing upright, the aperture 22 is facing in a substantially horizontal direction. The aperture 22 thus extends essentially the forward-backward direction and up-down direction. The aperture 22 is configured for inserting the tow element 18 into the receiving space from the left side of the bicycle, for example in an aperture aligned position with the connection element 20 substantially extending towards the left from the body 14 and the bicycle. The tow element 18 can only be inserted into the receiving space through the aperture 22 in a direction substantially parallel to the direction the aperture 22 is facing.

The trailer hitch 10 comprises a retention device with a blocking element 24. In FIG. 1, the blocking element 24 is arranged in a blocking position adjacent the aperture 22. The blocking element 24 partially blocks the aperture 22 in its blocking position so that the tow element 18 cannot be extracted from the receiving space through the aperture 22. When trying to extract the tow element 18, the tow element 18 will push the blocking element 24 against a left part of a wall of the body 14, firmly holding it in its blocking position. The retention device is thus in its blocking state.

The blocking element 24 is transversally moveably attached to the body 14. A pin shaped section of the blocking element 24 extends through the body 14 in the forward-backward direction. An actuation section 26 extends beyond the body 14 in the forward direction. When pushing against the actuation section 26, the blocking element 24 moves away transversally towards the right side and away from the aperture 22 into its release position. Alternatively or additionally, the blocking element may also pivot around a backwards end of the blocking element 24. In the release position, the blocking element 24 at least partially unblocks the aperture 22 so that the tow element 18 can be extracted from the receiving space through the aperture 22. The retention device is thus in its release state.

The blocking element 24 is spring biased towards its blocking position. When releasing the actuation section 26, the blocking element will therefore return towards its blocking position. When inserting the tow element 18 through the aperture 22 into the receiving space, the blocking element 24 will be pushed out of the way by the tow element 18. The blocking element 24 will therefore automatically adjust into its release position when the tow element 18 is inserted for trailer connection to the bicycle. No manual adjustment is needed, as the retention device is only configured to block disconnection of the tow element 18 and thus the trailer but not to block connection of the tow element 18 and thus the trailer. After inserting the tow element 18 into the receiving space, the biased blocking element 24 will automatically return into its blocking position.

Figure 2:
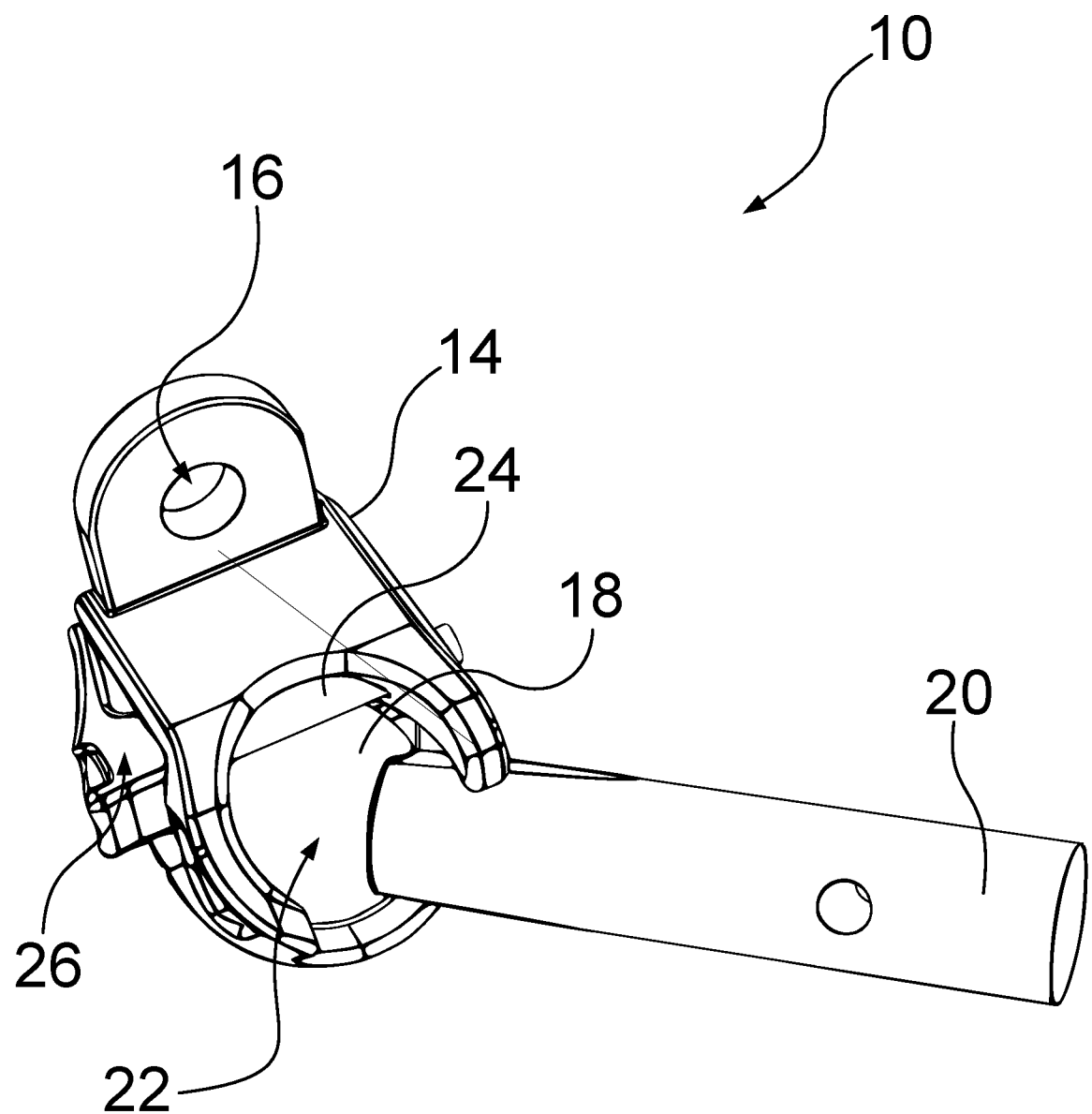
FIG. 2 illustrates the trailer hitch of FIG. 1 in a perspective view, wherein the tow element is arranged in a tug orientation.
Figure 3:
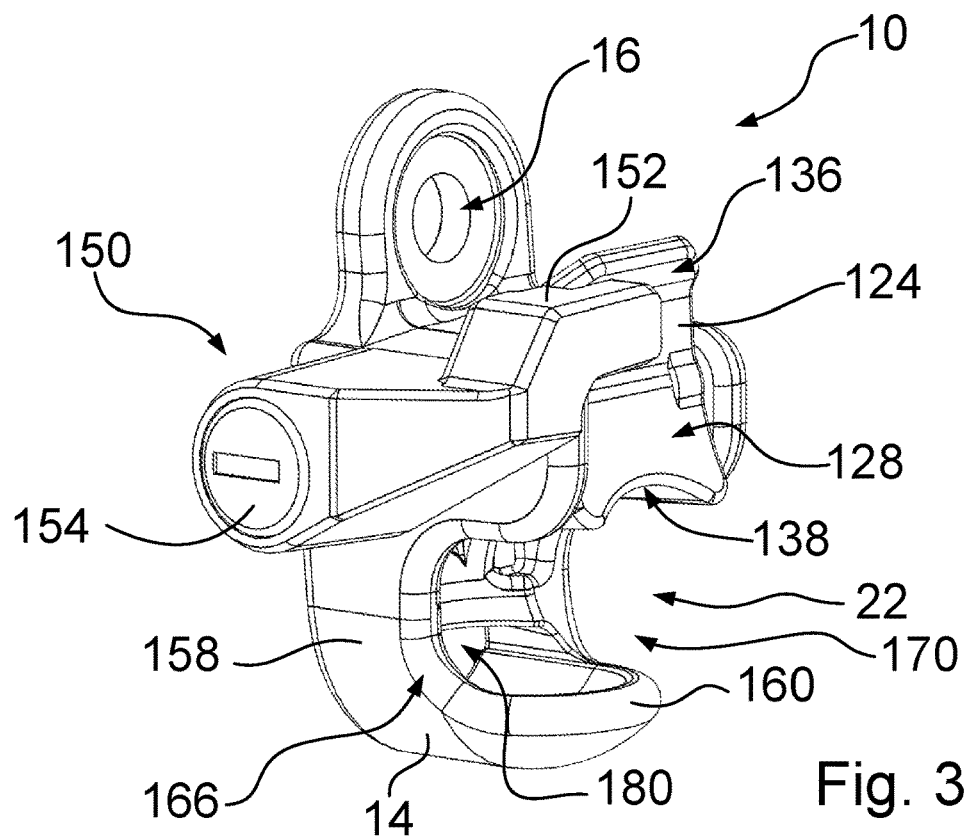
FIG. 3 illustrates a second embodiment of a trailer hitch including a locking device in a top forward perspective view.

FIG. 2 shows the trailer hitch 10 with the tow element 18 in a tug position. In the tug position, the connection element 20 extends further backwards than in the aperture aligned position. The bar element attached to the connection element 20 may be angled so that an end section connected to a trailer body may extend essentially in the forward-backward direction. The connection element 20 is arranged at least partially in a through hole in a back wall of the body 14 that faces backwards. The tow element 18 itself is supported on the back wall of the body 14 so that forces pulling the trailer forward may be supported thereon. Details of the through hole will be shown and described in further details for other embodiments.

FIGS. 3 to 17 relate to a second embodiment of the trailer hitch 10, which primarily has a different retention device as the first embodiment of FIGS. 1 and 2. Otherwise, the functionality and overall structure is similar to the first embodiment and will not be described in detail again. Further features and functions described for the second embodiment of the trailer hitch 10 may also be included in the first embodiment, even when not shown in FIGS. 1 and 2.

Figure 9:
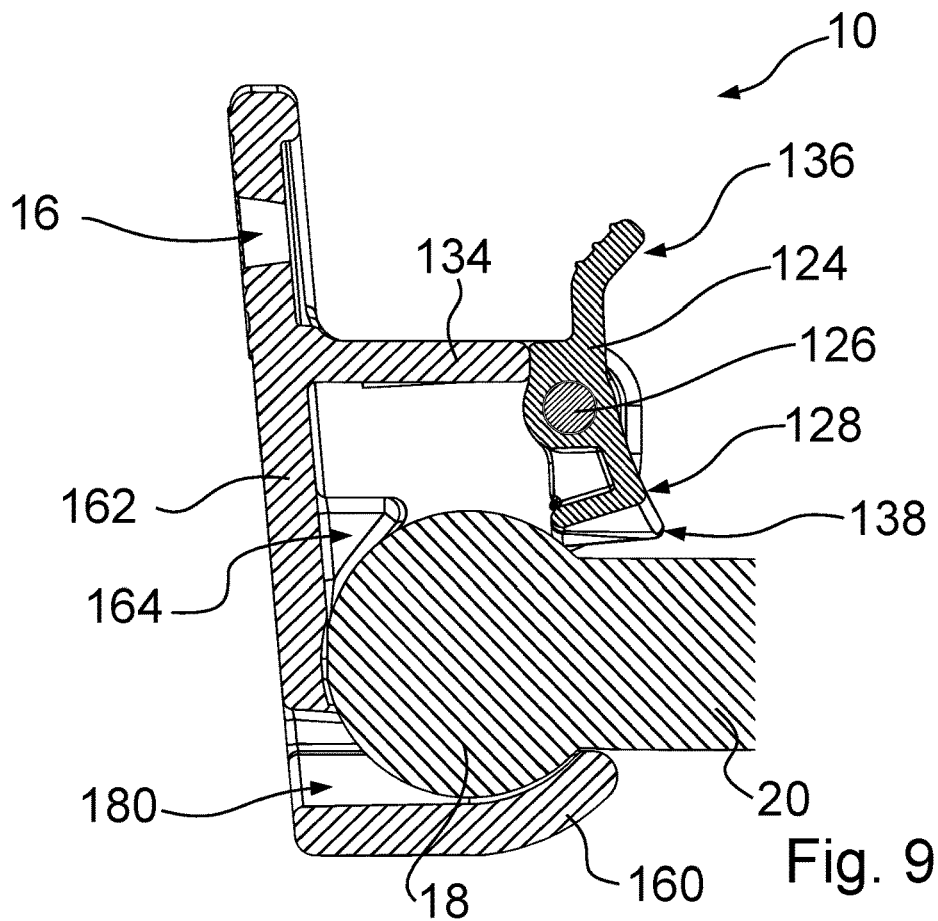
FIG. 9 illustrates the trailer hitch of FIG. 3 in a frontal sectional view, wherein a tow element is inserted into a receiving space of a body of the trailer hitch and a retention device of the trailer hitch is in its blocking state.
Figure 10:
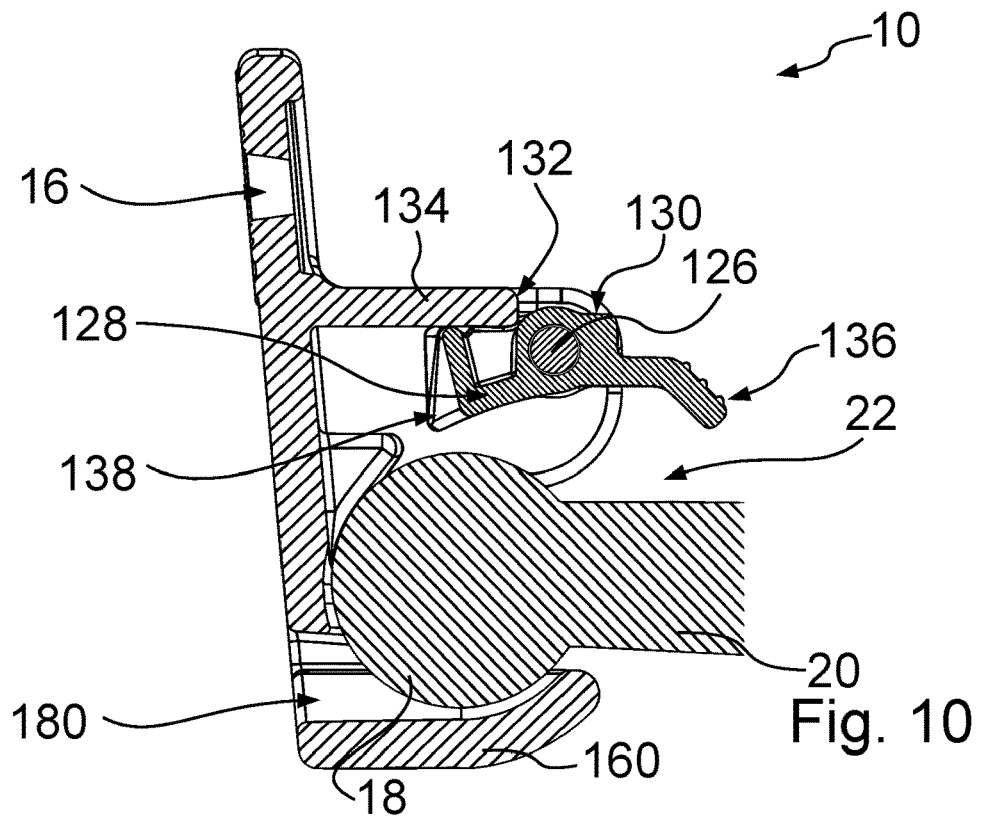
FIG. 10 illustrates the trailer hitch of FIG. 3 in a frontal sectional view, wherein the tow element is inserted into a receiving space of the body of the trailer hitch and the retention device of the trailer hitch is in its release state.

As can best be seen in FIGS. 9 and 10, the retention device of the second embodiment comprises a pivotable blocking element 124 pivotably moveably attached to the body 14 of the trailer hitch 10. The blocking element 124 is configured as a metal lever with a unitarian one-piece design. A pivot axis is, for example, formed by either a pin 126 extending through the pivotable blocking element 124 in the forward-backward direction or a first pin section at a backward end of the pivotable blocking element 124 and a second pin section at a forward end of the pivotable blocking element 124. The pivot axis extends in the forward-backward direction. FIG. 9 shows the pivotable blocking element 124 in a blocking position so that the retention device is in its blocking state. A retention section 128 is arranged at a lower end of the pivotable blocking element 124 in the blocking position and extends in the aperture 22. A side of the retention section facing towards the receiving space is formed so that when trying to extract the tow element 18 out of the receiving space with the retention device in the blocking state, the tow element 18 will engage the retention section 128 and be blocked from extraction. The pivotable blocking element 124 may not pivot outward as a flat section 130 is stopped by a blocking element facing side 132 of an upper wall 134 of the body 14.

To extract the tow element 18 from the receiving space and thus disconnect the trailer from the trailer hitch 10 and the bicycle, the pivotable blocking element 124 needs to be pivoted inward so that the retention section 128 moves towards the upper wall 134 of the body 14 and out of the way in the aperture 22. For that purpose, a user may pull on an actuation section 136 of the pivotable blocking element 124. The actuation section 136 is arranged on an end of the pivotable blocking element 124 opposite the retention section 128, which is arranged above the pivot axis in the blocking position.

The actuation section 136 has a ribbed surface facing the right side and the bicycle in the blocking position. The ribbed surface provides additional grip for a user pulling on the actuation section 136 to pivot the pivotable blocking element 124 in its release position. The release position of the pivotable blocking element 124 and thus the release state of the retention device is shown in FIG. 10. As can be seen, the retention section 128 has been pivoted out of the aperture 22 until coming to a rest on a receiving space facing side of the upper wall 134 of the body 14, which thus forms another end stop. This prevents pivoting the pivotable blocking element 124 so far that the actuation section 136 could otherwise partially block the aperture 22. In this position, the tow element 18 can be freely extracted out of the receiving space.

Figure 15:
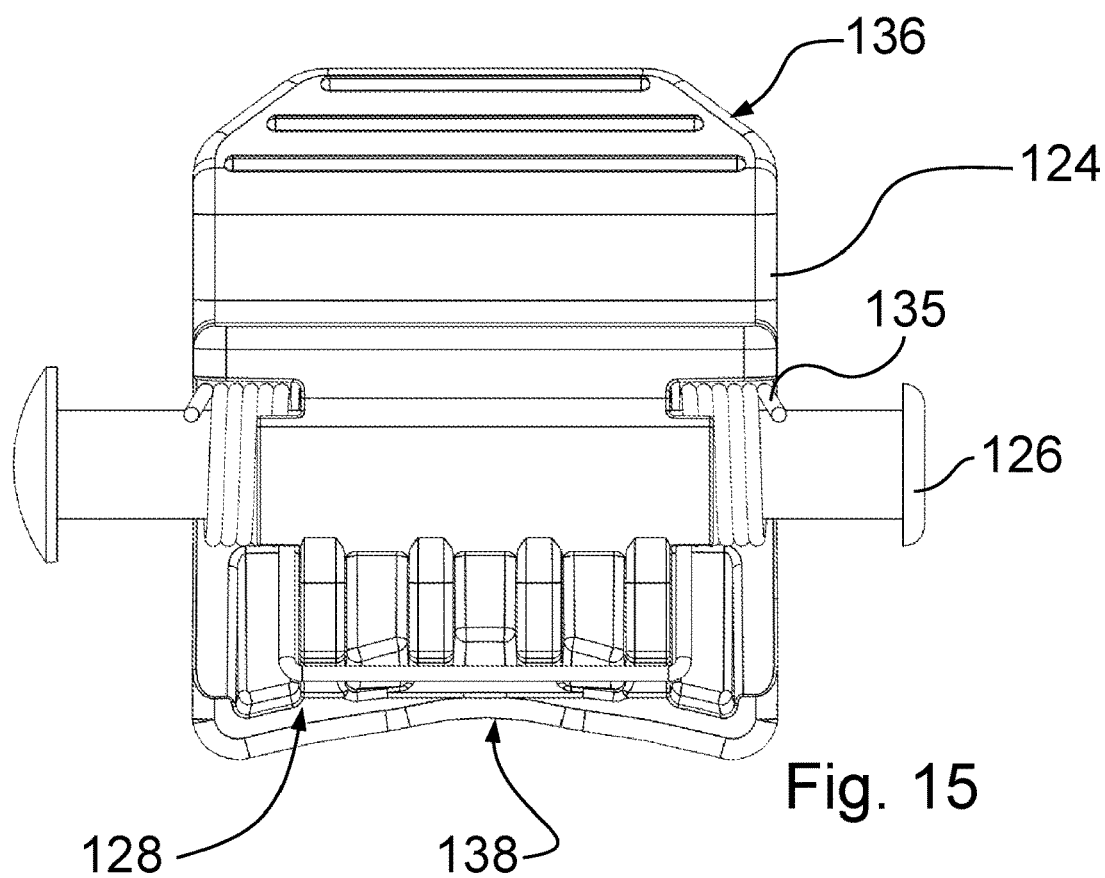
FIG. 15 illustrates the blocking element of the retention device of the trailer hitch of FIG. 3 in an elevational view from the side facing towards the bicycle when the trailer hitch is mounted to the bicycle.
Figure 16:
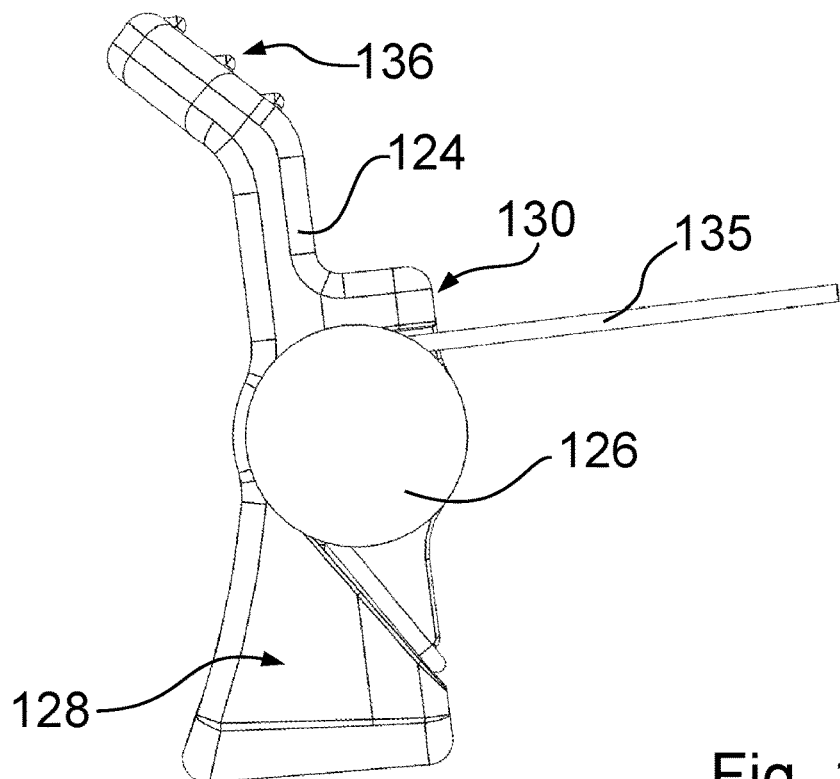
FIG. 16 illustrates the blocking element of the retention device of the trailer hitch of FIG. 3 in a back view.
Figure 17:
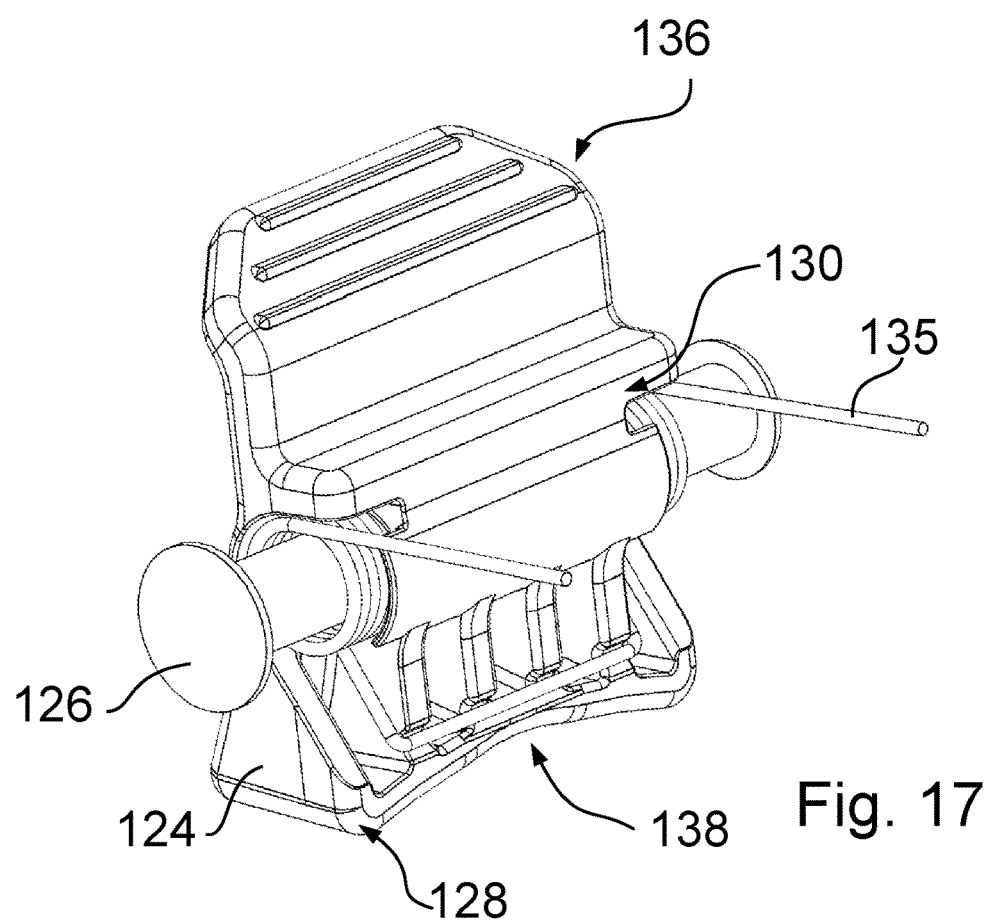
FIG. 17 illustrates the blocking element of the retention device of the trailer hitch of FIG. 3 in a perspective top view from the side facing towards the bicycle when the trailer hitch is mounted to the bicycle.

As can be seen in FIGS. 15 to 17, the retention device of the trailer hitch 10 according to the second embodiment also comprises a spring element 135. The spring element 135 biases the pivotable blocking element 124 towards its blocking position. For that purpose, the spring element 135 is mounted on the pin 126 with one end supported on the retention section 128 and another end supported on the receiving space facing side of the upper wall 134. The spring element 135 is configured so that a user may pivot the pivotable blocking element 124 into the release position with just one finger, such as a thumb, of a hand that also holds the drawbar. The user may therefore intuitively disengage the tow element 18 from the trailer hitch 10 with just one hand.

The retention device is configured so that a user may simply push the tow element 18 against the retention section 128 from the outside to insert the tow element 18 into the receiving space. The tow element 18 will pivot the pivotable blocking element 124 out of the way into the release position. After the tow element 18 is inserted into the receiving space, the pivotable blocking element 124 will automatically pivot back into the blocking position due to a spring force provided by the spring element 135. The tow element 18 will thus automatically be retained on the trailer hitch 10.

An edge 138 of the retention section 128 which faces the aperture in the blocking position and is a lower edge in the blocking position corresponds in shape to the tow element 18 by having a curved shape. The curved shape facilitates insertion and allows the tow element 18 to smoothly pass the pivotable blocking element 124 in the release position. Further, a height of the body 14 can be smaller due to the curved shape, resulting in a more compact trailer hitch 10.

Figure 4:
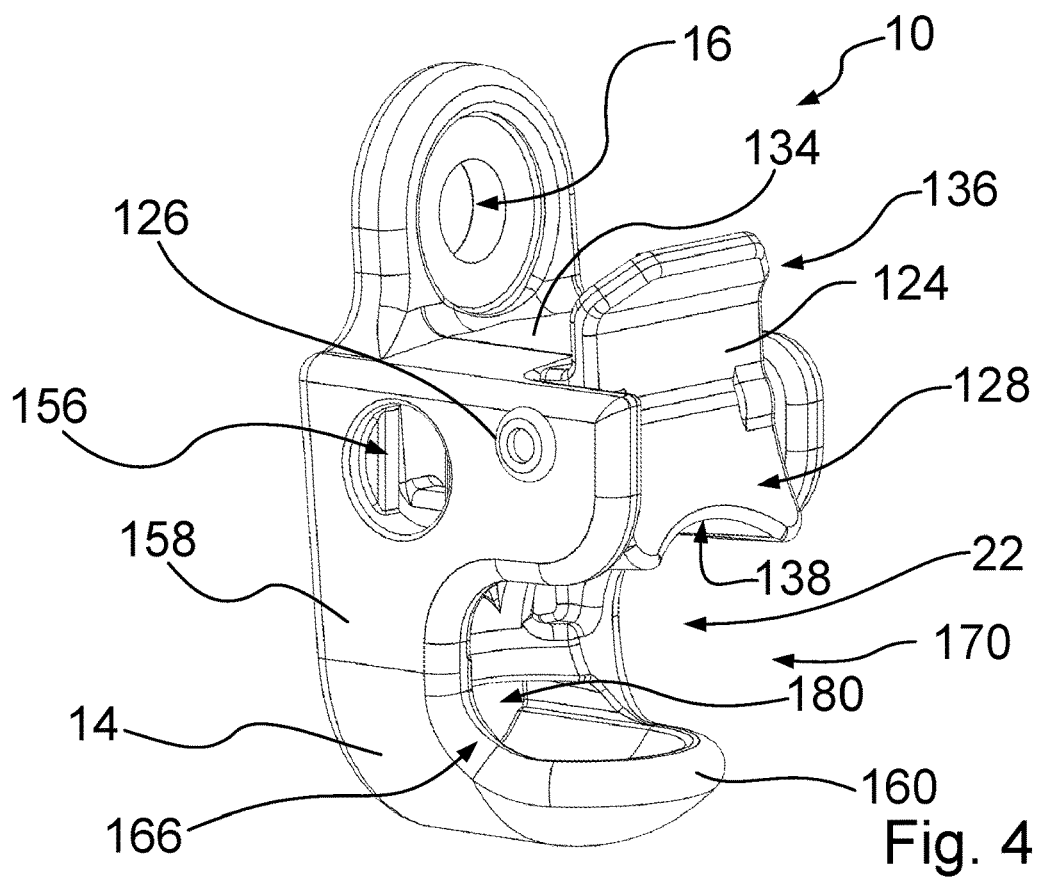
FIG. 4 illustrates the trailer hitch of FIG. 3 without the locking device in a perspective view.
Figure 5:
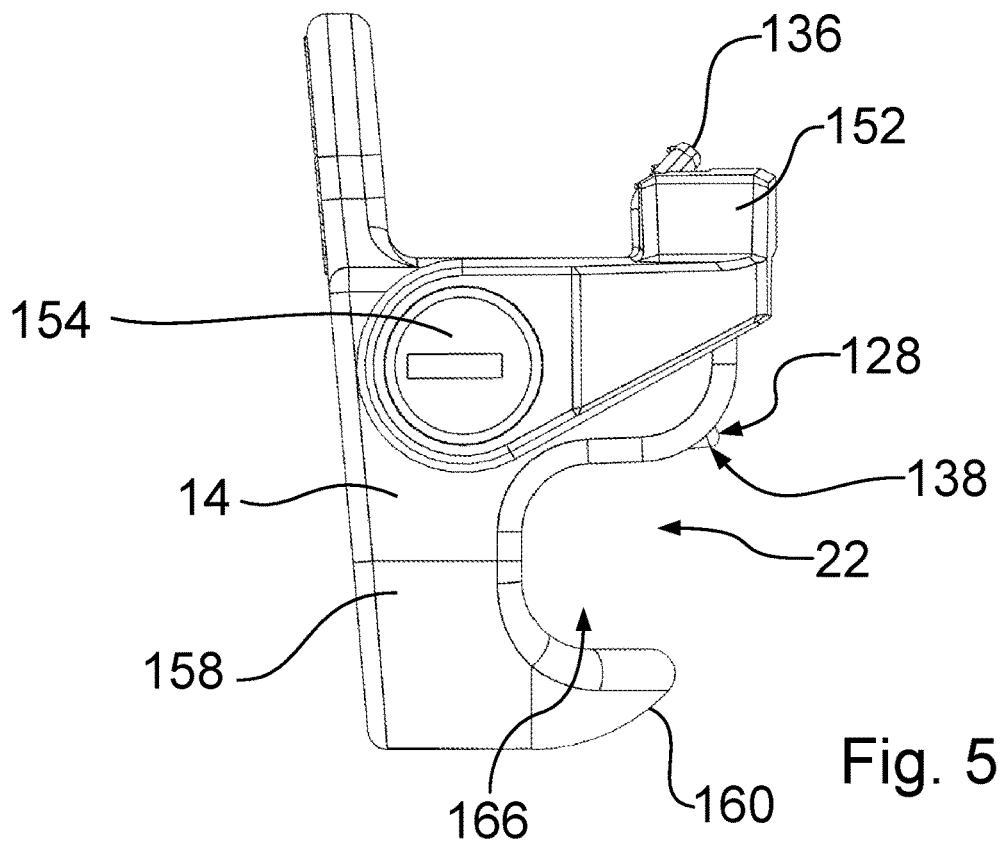
FIG. 5 illustrates the trailer hitch of FIG. 3 in a frontal view.
Figure 6:
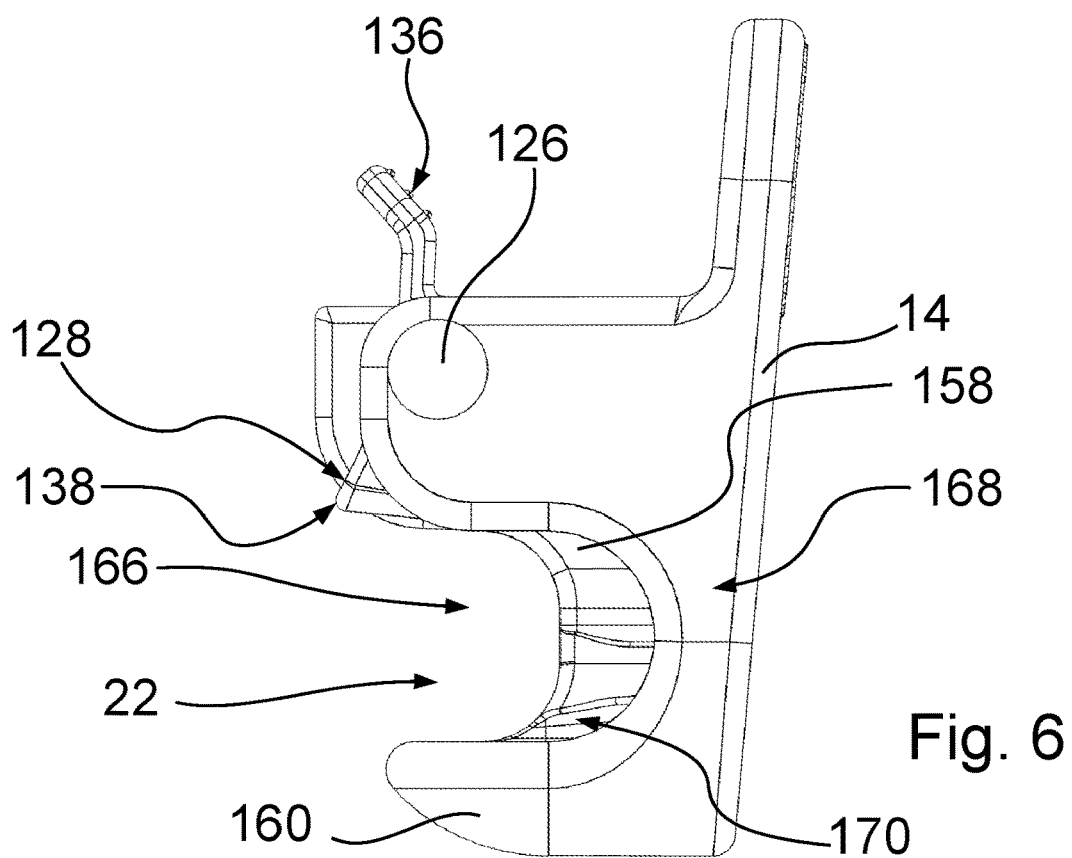
FIG. 6 illustrates the trailer hitch of FIG. 3 in a back view.
Figure 7:
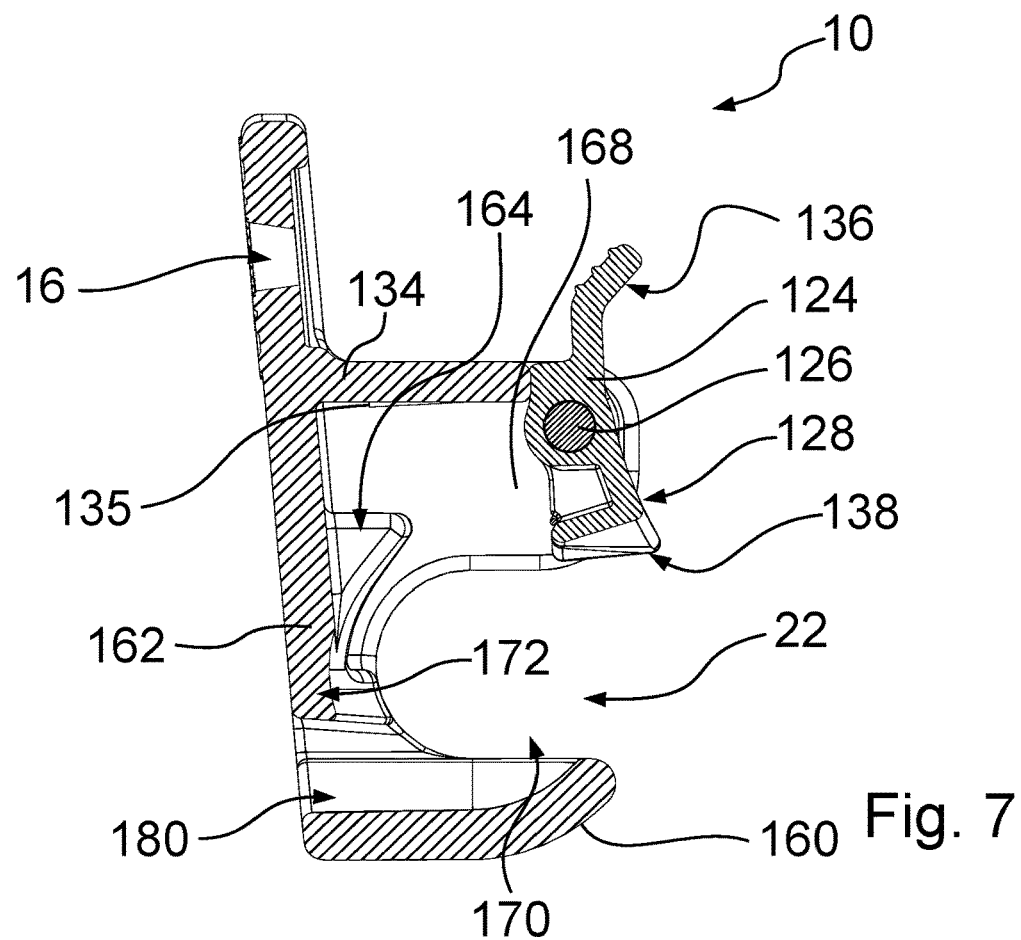
FIG. 7 illustrates the trailer hitch of FIG. 3 in a frontal sectional view.
Figure 8:
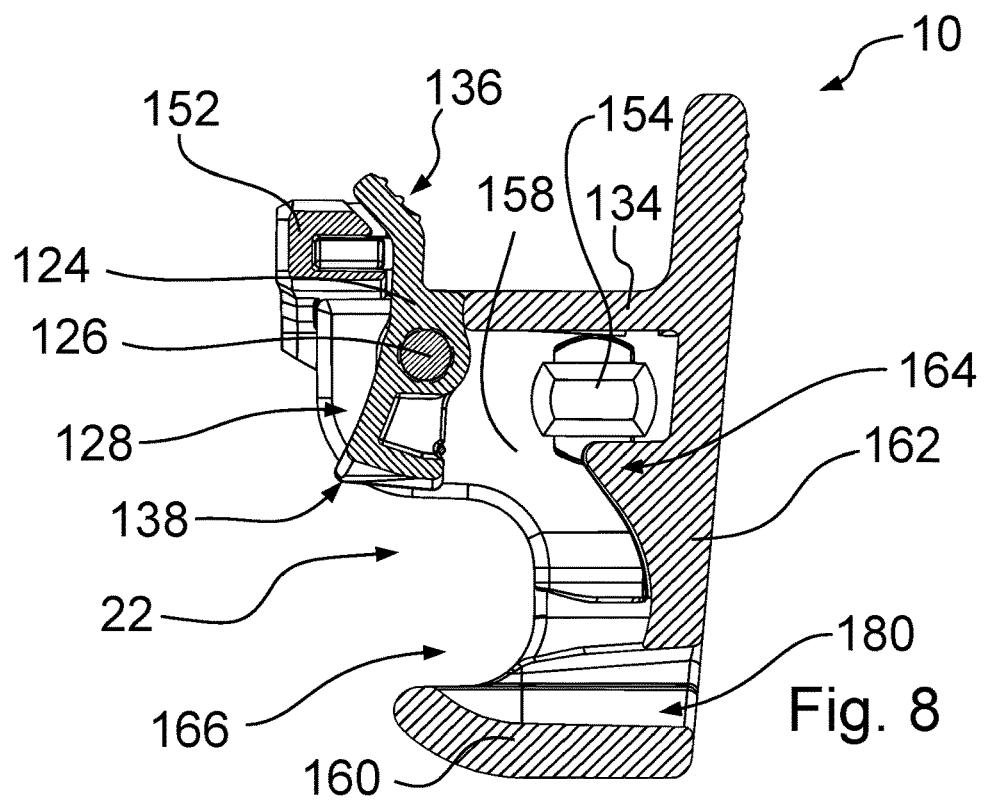
FIG. 8 illustrates the trailer hitch of FIG. 3 in a backward sectional view.

The trailer hitch 10 according to the second embodiment comprises a locking device 150 configured to prohibit adjustment of the retention device from the blocking state to the release state. The locking device 150 can best be seen in FIG. 3, in which the locking device 150 is shown in the locking state. The locking device 150 comprises a locking element 152, which is arranged at the body 14 so that it blocks pivoting of the pivotable blocking element 124 by engaging its actuation section 136. The locking element 152 can be disengaged from the actuation section 136 by unlocking a locking cylinder 154 holding the locking element 152 on the body 14. The locking element 152 can be shifted out of engagement with the pivotable blocking element 124 once unlocked or can even be fully removed, as shown in FIG. 4. The locking device 150 may thus be provided as an add-on part. As can be seen in FIGS. 4 and 8, the locking device 150 is mounted to the body 14 with the locking cylinder 154 inserted in a though hole 156 in a forward wall 158 of the body 14.

The walls of the body 14 are shaped to provide a self-centering effect for the tow element 18 in the receiving space. For that purpose, a lower wall 160 of the body 14 corresponds in shape to the tow element 18, having an essentially spherical trough shape on the side facing the receiving space, as can best be seen in FIGS. 3 and 4. Similarly, a right side wall 162 has a protruding section 164 protruding towards the receiving space and the aperture 22. The protruding section 164 also corresponds in shape to the spherical tow element 18. Underneath the protruding section, the right side wall 162 also comprises a concavely shaped receiving space facing wall section 172 that also corresponds in shape to the tow element 18. The tow element 18 therefore will remain substantially at a fixed location in the body 14 and may only turn about a center. The connection between the tow element 18 and the body 14 therefore forms a kind of ball joint, which allows the tow element 18 to rotate but prevents or at least limits transversal movement within the body 14. The trailer can thus be pulled very smoothly with the bicycle.

This is further supported by the forward wall 158, which extends very far towards the aperture 22 with just a small recess 166 facing in the forward direction and adjacent the aperture 22. The recess 166 allows the connection element 20 to be arranged in a somewhat forward direction so that tight left turns with the bicycle despite a connected trailer may be possible. As can be taken, for example, from FIG. 6, a rear wall 168 has a similar recess 170 facing in the backward direction and adjacent the aperture 22. The backward recess 170 is more pronounced than the forward recess 166, extending further away from the aperture 22. This allows similar tight turns to the right with the bicycle when the trailer is connected and the trailer hitch is arranged on the left side of the frame of the bicycle. Both the recess 166 and the recess 170 can be considered as a through hole connecting the receiving space to an exterior of the body 14. Sections of the forward wall 158 and the rear wall 168 may be concavely shaped correspondingly to the tow element 18, similar to the concavely shaped receiving space facing wall section 172 of the right side wall 162, to further support centering of the tow element 18 in the receiving space.

Both recesses 166, 170 are smaller than a diameter of the tow element 18, so that the tow element cannot be inserted and extracted in the forward and backward direction. Instead, the forward wall 158 and the rear wall 168 both support the tow element 18 in the forward and backward direction in the receiving space, respectively. Hence, forward and backward movement of the tow element 18 in the receiving space is prevented or at least limited. By comparison, the aperture 22 is larger than the diameter of the tow element 18.

Figure 11:
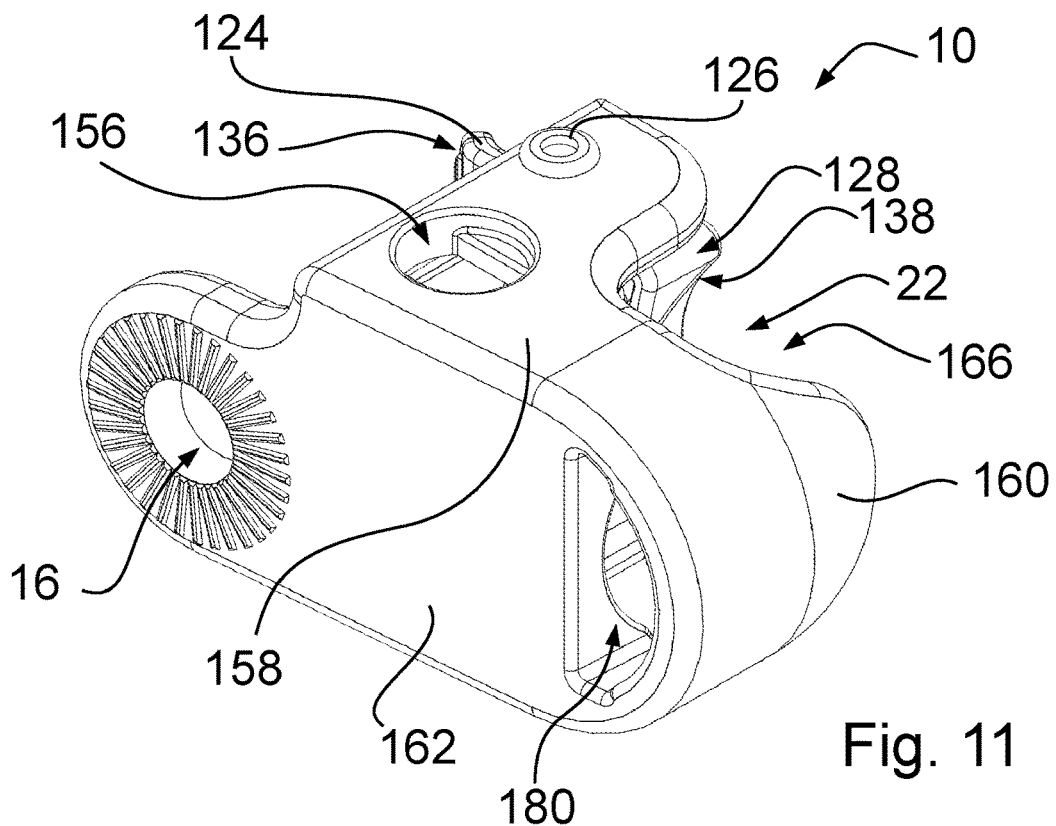
FIG. 11 illustrates the trailer hitch of FIG. 3 without the locking device in a perspective view from a side facing towards the bicycle when the trailer hitch is mounted to the bicycle.
Figure 12:
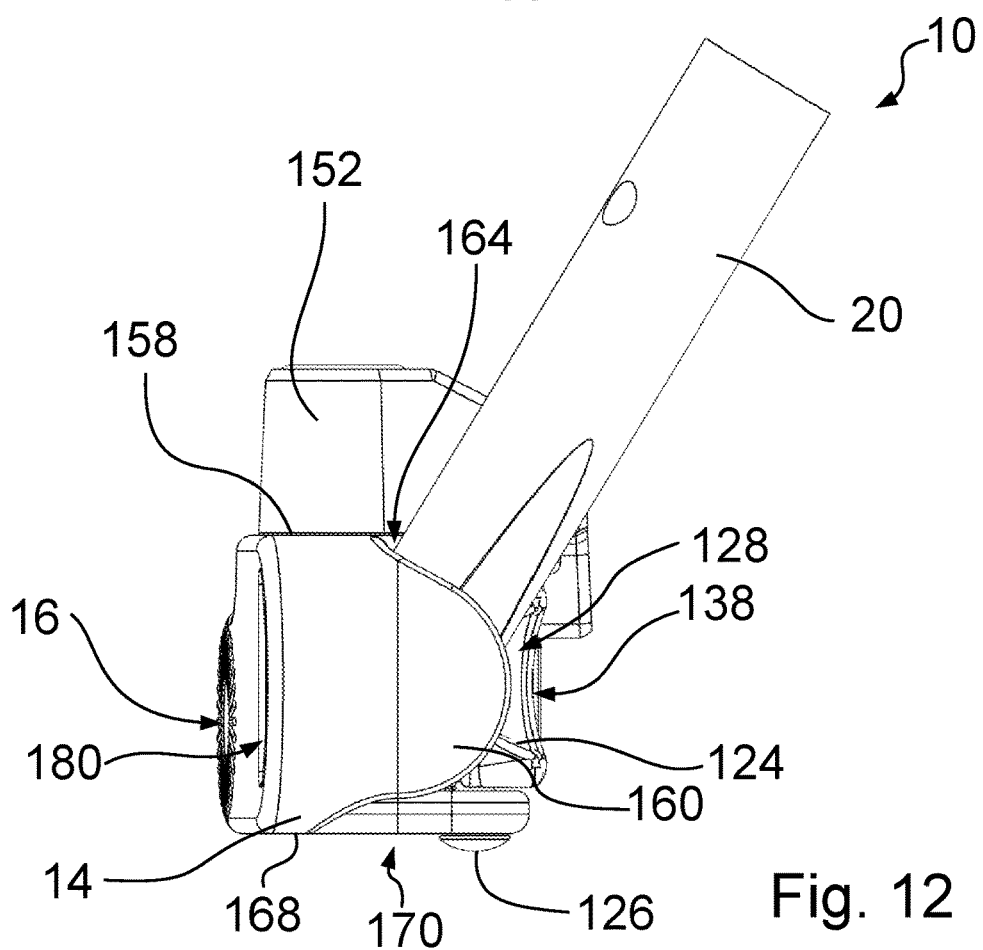
FIG. 12 illustrates the trailer hitch of FIG. 3 with the locking device and with the tow element arranged in a tug orientation in a bottom view.
Figure 13:
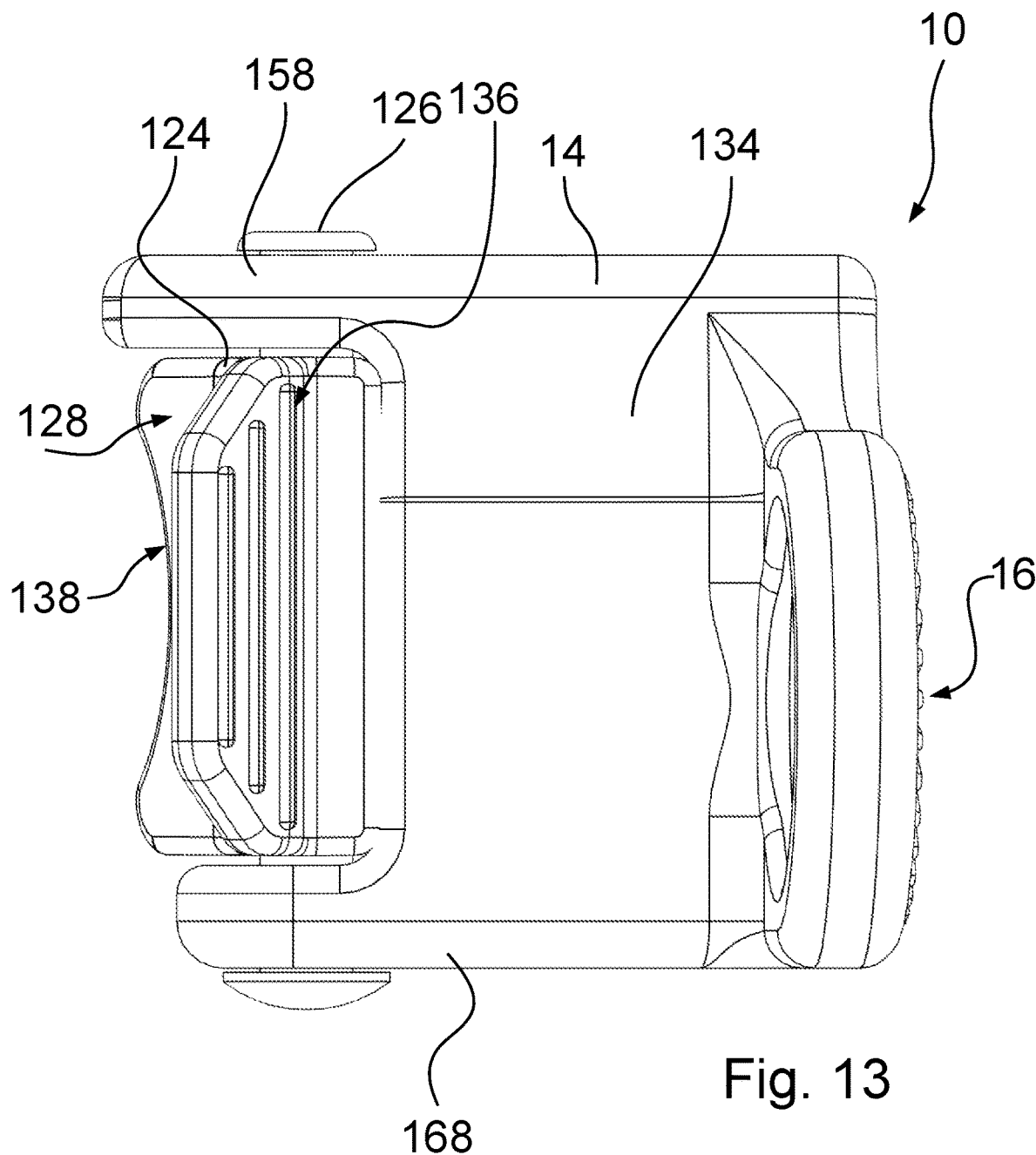
FIG. 13 illustrates the trailer hitch of FIG. 3 without the locking device in a top view.
Figure 14:
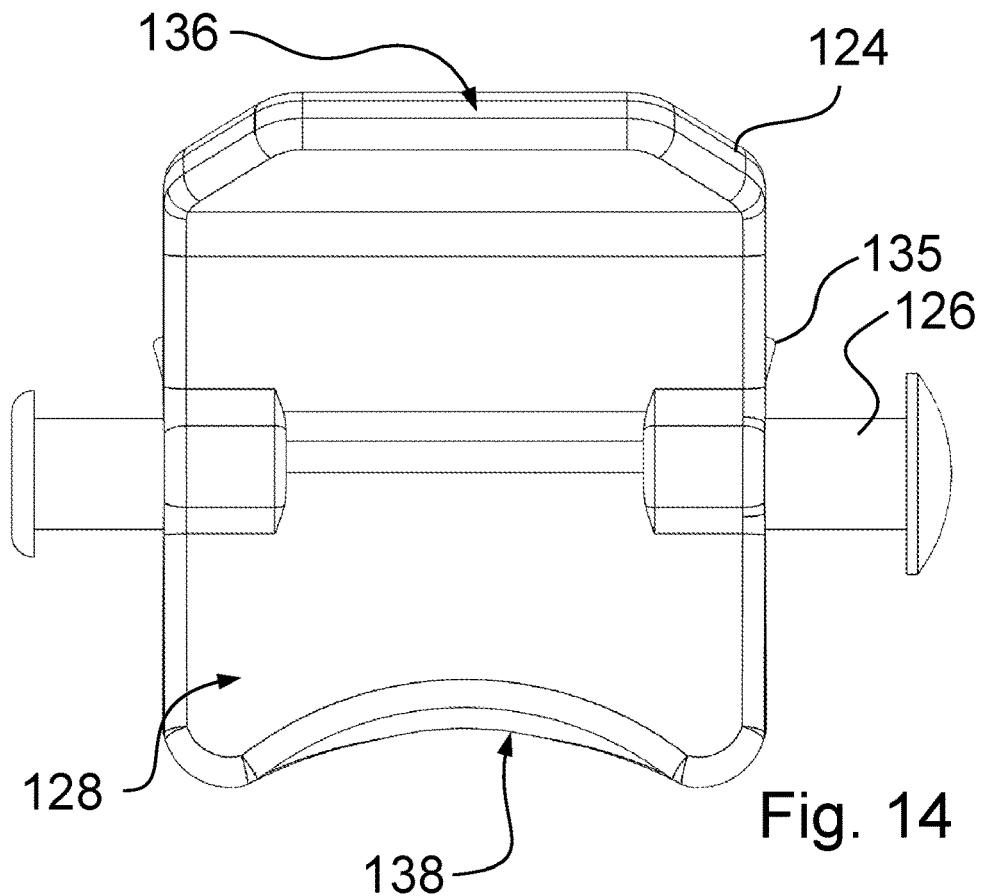
FIG. 14 illustrates a blocking element of the retention device of the trailer hitch of FIG. 3 in an elevational view from a side facing away from the bicycle when the trailer hitch is mounted to the bicycle.

FIG. 11 shows a right side of the body 14 which faces the bicycle frame when the trailer hitch 10 is mounted to the bicycle. As can be seen, an area adjacent the through hole 16 for mounting to the rear axle is ribbed. This ribbed area increases engagement of the body 14 to the frame so that twisting of the body 14 can be reliably prevented even with low mounting forces.

As can be seen in FIG. 11, the right wall 162 has a lower through hole 180. The through hole 180 allows water to drain from the receiving space and in particular through the trough shaped lower wall 160.

Figure 18:
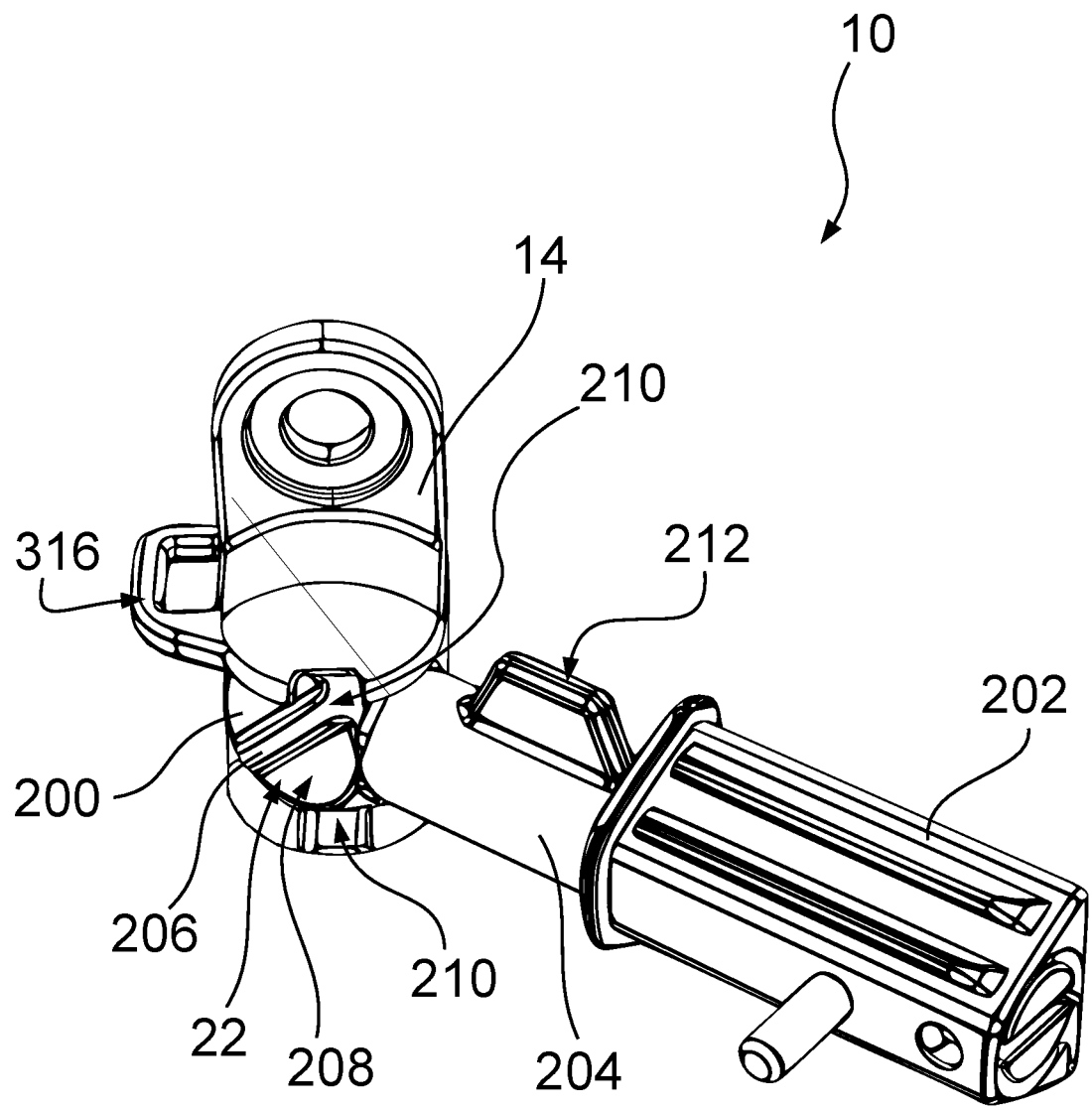
FIG. 18 illustrates a bicycle trailer system comprising a third embodiment of a trailer hitch and a retention device formed by the tow element and bar element of the trailer in a top forward perspective view, wherein the retention device is in its blocking state.
Figure 19:
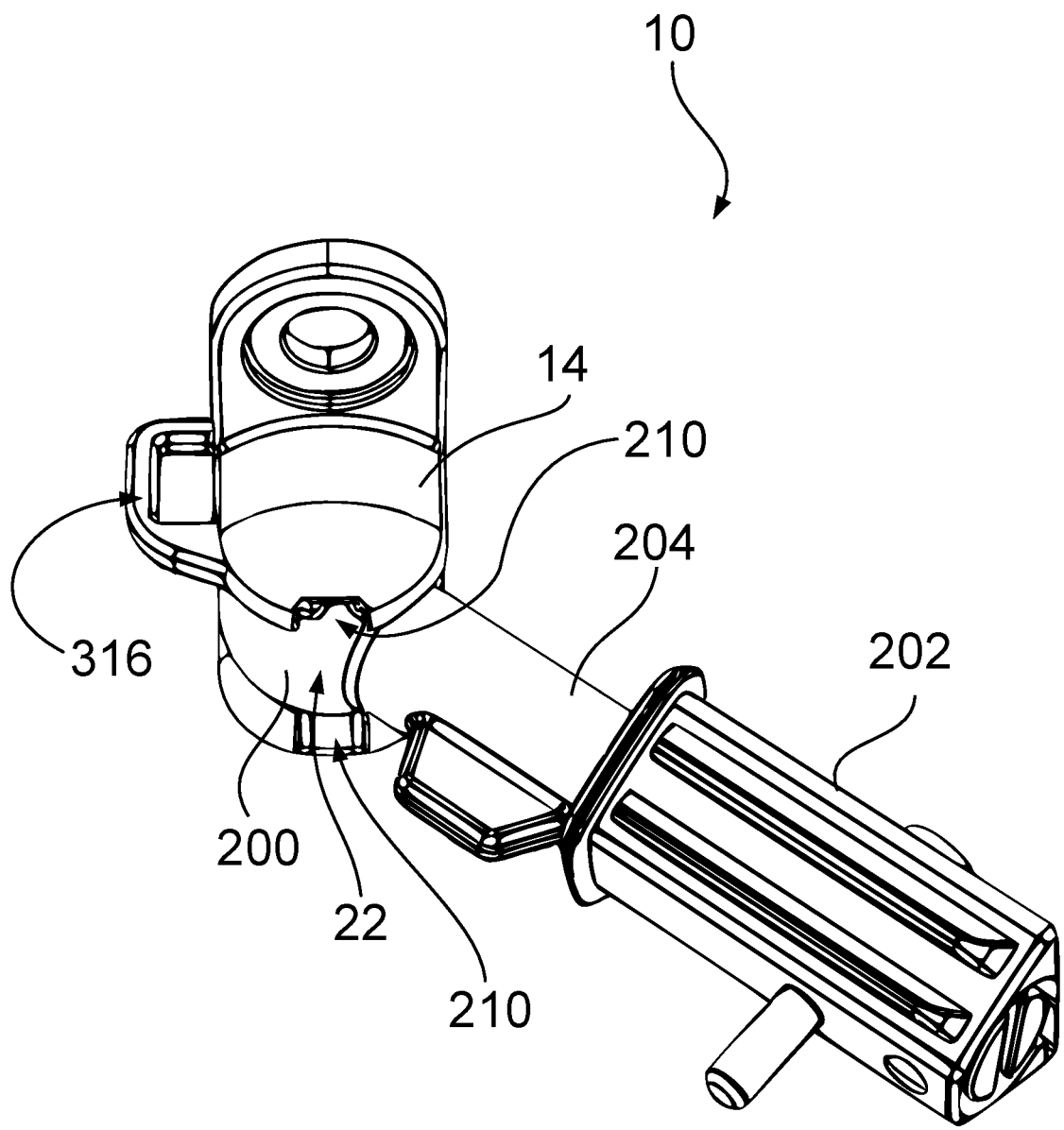
FIG. 19 illustrates the bicycle trailer system of FIG. 18 in a top forward perspective view, wherein the retention device is in its release state.

FIGS. 18 and 19 show a bicycle trailer system comprising a third embodiment of a trailer hitch 10 and a retention device formed by a differently shaped tow element 200 and bar element 202. Again, the retention device is different while other features and functions may be similar to the previously described embodiments. Only relevant differences will be described.

The tow element 200 is connected to the bar element 202 with a connection element 204 that forms a unitarian one-piece part with the tow element 200. The tow element 200 can be rotated relatively to the bar element 202 around a longitudinal axis between a blocking orientation and a release orientation. The tow element 200 is spring-biased towards the blocking orientation.

As can be seen in FIG. 18, the tow element 200 has at least one planar side 208 with a ridge 206 projecting therefrom. An opposite side of the tow element 200 which cannot be seen in FIG. 18 is formed correspondingly. Otherwise, the tow element 200 has a spherical shape similar to the tow element 18 of the other embodiments. As can be seen in FIG. 18, due to this shape, the tow element 200 cannot pass the aperture 22. FIG. 19 shows the release orientation of the tow element 200. In the release orientation, the ridges 206 are aligned with grooves 210 in the body 14 so that the tow element 200 can be inserted into and extracted from the receiving space. Due to the grooves 210 forming part of the aperture 22, the tow element 18 can only be inserted into the receiving space through the aperture 22 in a direction substantially parallel to the direction the aperture 22 is facing in this embodiment as well.

The tow element 200 has an actuation section 212 that is formed as a protrusion on the connection element 204. The actuation section 212 allows a user to twist the tow element with a thumb of a hand holding the drawbar, in particular the bar element 204.

Figure 20:
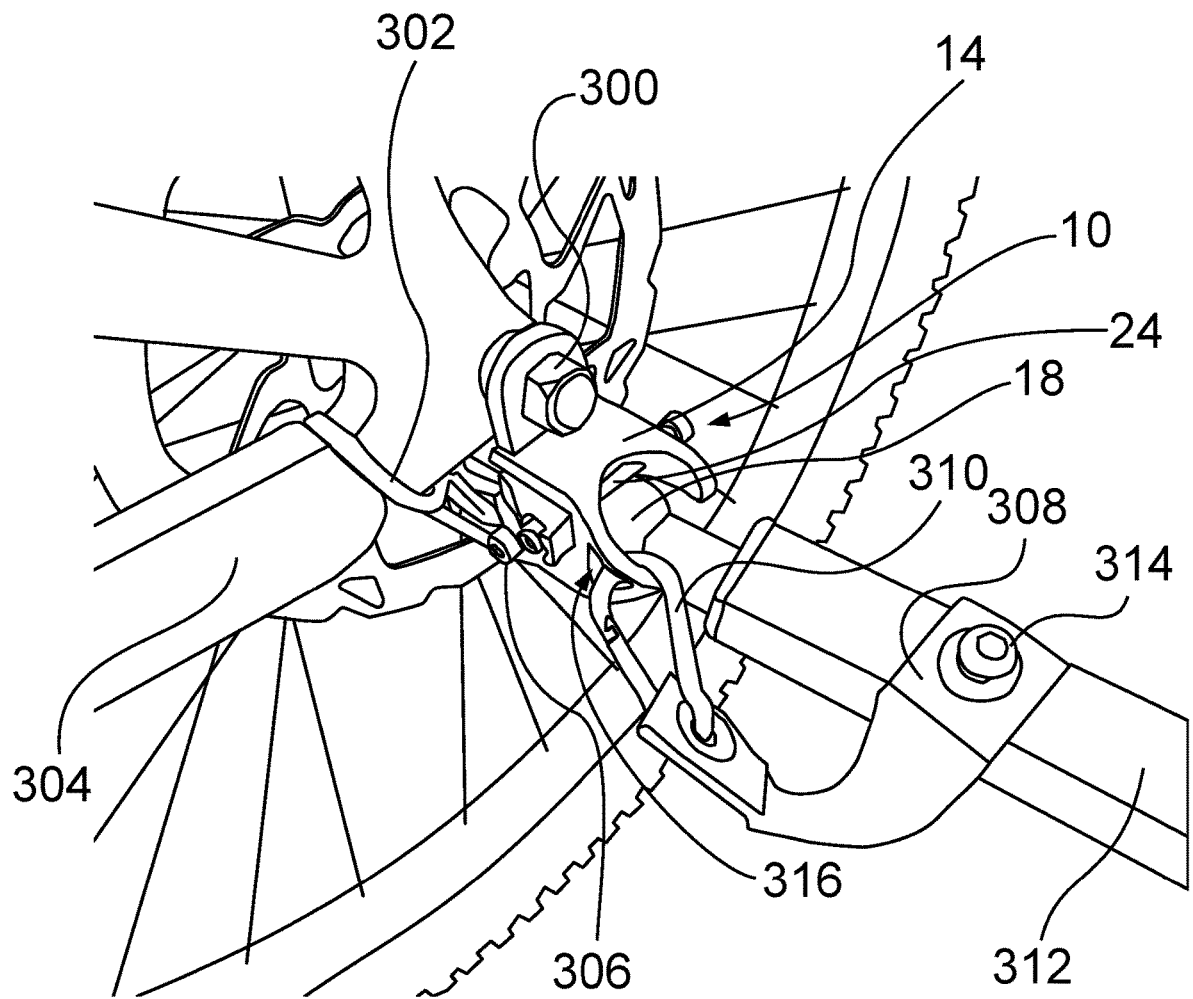
FIG. 20 illustrates another embodiment of a bicycle trailer system with a fourth embodiment of a trailer hitch mounted to a bicycle in a perspective view, the system comprising a safety device configured to provide a redundant connection of the trailer to the bicycle.

FIG. 20 illustrates another embodiment of a bicycle trailer system with a fourth embodiment of a trailer hitch 10 mounted to a bicycle. In the shown example, the trailer hitch is mounted to a left side of the rear axle 300, although other mounting position are suitable as well. The system comprises a safety device which has not been shown for the other embodiments but can be provided to them as well.

The safety device is configured to provide a redundant connection of the trailer to the bicycle. For that purpose, the safety device comprises a first securing element 302. The first securing element 302 is configured as a cable or strap and is wrapped around a tube 304 of the frame of the bicycle connected to the rear axle, although it may also be attached to other tubes of the frame as well. The first securing element 302 is configured to remain attached to the bicycle frame independently of an attachment of the trailer to the trailer hitch 10. The tow element 18 can therefore be extracted from the body 14 without requiring detaching the first securing element 302 and thus to fully disengage the safety device.

The first securing element 302 provides a redundant connection for the body 14 to the frame of the bicycle. This redundant connection can remain in force for as long as the trailer hitch 10 remains mounted to the frame of the bicycle. Hence, cumbersome attachment to a potentially dirty part of the frame of the bicycle is only required once. For example, the first securing element 302 can thus also be attached very tightly. The first securing element 302 can be correspondingly short. Hence, the first securing element 302 is very lightweight and a risk for entanglement with moving parts of the bicycle is low. The connection may be very sturdy and attachment and detachment may even require tools. In the shown example, the first securing element 302 is attached with both ends to the body 14 of the trailer hitch 10 by means of a screw 306. The first securing element 302 will keep the body 14 attached to the bicycle in case of a failure of the mounting to the rear axle 300. The bike may thus be brought to a stop with the trailer still connected to the bicycle in case of such a failure. Uncontrolled loss of the trailer can be avoided in case of such a failure.

The safety device also comprises a second securing element 308, which is configured as a textile strap. The second securing element 308 comprises a snap hook 310 at a first end. At an opposite second end, the second securing element 308 is fixedly attached to a bar element 312 of the drawbar of the trailer by means of a screw 314. The second securing element is hooked to the body 14 of the trailer hitch 10 with the snap hook 310 to provide a redundant connection between the drawbar and the body 10. Hence, if the tow element 18 is accidentally released from the receiving space or the connection between the tow element 18 and the body 14 fails, the second securing element 308 will keep the trailer attached to the body 14. The bike may thus be brought to a stop with the trailer still connected to the bicycle in case of such a failure. Uncontrolled loss of the trailer can thus be avoided in case of such a failure.

The snap hook 310 allows easy and fast connection and disconnection of the second securing element 308 to the body 14. For example, the body 14 may comprise an eyelet 316 for this attachment, which is also shown for the embodiment of FIGS. 18 and 19. When the trailer is not connected to the trailer hitch 10, the second securing element 308 will remain with the drawbar. Loose straps on the trailer hitch 10 can thus be avoided, which would otherwise potentially require stowing by the user to avoid entanglement with moving parts of the bike.

In other embodiments, the second securing element 308 can be part of the trailer hitch 10. This allows retrofit to a bicycle trailer system without change of the trailer and its drawbar. However, the second securing element 308 can also be retrofitted to existing trailers or part of the drawbar can be replaced for retrofit. Such a retrofit may also involve removing any additional securing elements on the trailer, which may for example be replaced by the first securing element. In other embodiments, the second securing element may not attach with one end to the body 14 but rather to the first securing element 302. Further, an end of the second securing element 308 may be permanently fixed to the body 14 and/or the first securing element 302 and an opposite end may be configured for removable attachment to the drawbar of the trailer, for example with the snap hook 310.

What is claimed is:

1. A trailer hitch configured to releasably connect a trailer to a bicycle, the trailer hitch comprising:
   a body comprising a receiving space for a tow element and configured to attach the trailer to the trailer hitch and configured to mount to the bicycle; and
   a safety device configured to provide a redundant connection of the trailer to the bicycle, the safety device comprising a first securing element configured to connect the body of the trailer hitch to a frame of the bicycle,
   wherein the first securing element is configured to remain attached to the bicycle frame independently of an attachment of the trailer to the trailer hitch.

2. The trailer hitch according to claim 1, wherein the first securing element is a first strap element.

3. The trailer hitch according to claim 1, wherein at least a first end of the first securing element is permanently fixed to the body of the trailer hitch.

4. The trailer hitch according to claim 3, wherein a second end of the first securing element is permanently fixed to the body of the trailer hitch or is removably attached to the body of the trailer hitch.

5. The trailer hitch according to claim 1, wherein the first securing element is configured to be wrapped around the frame of the bicycle.

6. The trailer hitch according to claim 1,
   wherein the safety device comprises a second securing element configured to removably connect the trailer to the body of the trailer hitch, the first securing element, the frame of the bicycle, or a combination thereof.

7. The trailer hitch according to claim 6, wherein the second securing element is a second strap element, wherein a first end of the second securing element is permanently fixed to the body of the trailer hitch, the first securing element, the frame of the bicycle, or a combination thereof.

8. The trailer hitch according to claim 6, wherein a first end of the second securing element is configured to removably attach to the body of the trailer hitch, the first securing element, the trailer, the frame of the bicycle, or a combination thereof.

9. The trailer hitch according to claim 6, wherein the body of the trailer hitch comprises an eyelet configured to attach to a first end of the second securing element.

10. The trailer hitch according to claim 6, wherein a connection of the trailer to the body of the trailer hitch prohibits adjustment of a retention device from a blocking state to a release state.

11. A bicycle trailer system, comprising:
    a trailer; and
    a trailer hitch configured to releasably connect the trailer to a bicycle, the trailer hitch comprising:
      a body comprising a receiving space for a tow element and configured to attach the trailer to the trailer hitch and configured to mount to the bicycle; and
      a safety device configured to provide a redundant connection of the trailer to the bicycle, the safety device comprising a first securing element configured to connect the body of the trailer hitch to a frame of the bicycle,
    wherein the first securing element is configured to remain attached to the bicycle frame independently of an attachment of the trailer to the trailer hitch.

12. The bicycle trailer system according to claim 11, further comprising a second securing element, wherein a first end of the second securing element is permanently fixed to the trailer and a second end of the second securing element is configured to removably attach to the body of the trailer hitch, the first securing element, the trailer, or a combination thereof.

13. The bicycle trailer system according to claim 12, wherein the trailer comprises an eyelet configured to attach to the second end of the second securing element.

14. The bicycle trailer system according to claim 11, wherein the system is configured for one handed attachment of the trailer to the trailer hitch.

15. A bicycle trailer system, comprising:
   a trailer; and
   a trailer hitch configured to releasably connect the trailer to a bicycle, the trailer hitch comprising:
      a body configured to attach the trailer to the trailer hitch and configured to mount to the bicycle;
      a safety device configured to provide a redundant connection of the trailer to the bicycle, the safety device comprising a first securing element configured to connect the body of the trailer hitch to a frame of the bicycle,
      wherein the first securing element is configured to remain attached to the bicycle frame independently of an attachment of the trailer to the trailer hitch.

16. The bicycle trailer system of claim 15, wherein the body of the trailer hitch further comprises a recess for a tow element.

17. The bicycle trailer system of claim 16, wherein the tow element extends from a drawbar configured to attach to the trailer.

18. The bicycle trailer system of claim 16, wherein the tow element is a tow ball or pin.

19. The bicycle trailer system of claim 15, further comprising a drawbar configured to attach to the trailer, wherein the drawbar comprises a bar element and a connection element configured to attach the bar element to a tow element.

20. The bicycle trailer system of claim 15, further comprising a second securing element configured to removably attach to the body of the trailer hitch or the frame of the bicycle.

* * * * *